(12) United States Patent
Matsuya

(10) Patent No.: US 7,548,344 B2
(45) Date of Patent: Jun. 16, 2009

(54) IMAGE PROCESSING APPARATUS, AND METHOD OF CONTROLLING THE SAME

(75) Inventor: Akihiro Matsuya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 440 days.

(21) Appl. No.: 11/379,690

(22) Filed: Apr. 21, 2006

(65) Prior Publication Data
US 2006/0181725 A1    Aug. 17, 2006

Related U.S. Application Data

(62) Division of application No. 10/014,416, filed on Dec. 14, 2001, now Pat. No. 7,061,647.

(30) Foreign Application Priority Data
Dec. 27, 2000    (JP)    ............................. 2000-399325

(51) Int. Cl.
*B41J 1/00*    (2006.01)
*G06F 15/00*    (2006.01)

(52) U.S. Cl. .................. 358/1.9; 358/504; 382/162
(58) Field of Classification Search ................ 358/1.9, 358/504, 500, 515, 530; 382/162
See application file for complete search history.

(56) References Cited

U.S. PATENT DOCUMENTS

| | | | | |
|---|---|---|---|---|
| 5,721,628 | A * | 2/1998 | Takaragi et al. | ............. 358/518 |
| 6,256,112 | B1 * | 7/2001 | Kawano | ..................... 358/1.9 |
| 6,449,060 | B1 * | 9/2002 | Kawai et al. | ................ 358/1.9 |

FOREIGN PATENT DOCUMENTS

JP    2000-172850    6/2000

* cited by examiner

*Primary Examiner*—Thomas D Lee
(74) *Attorney, Agent, or Firm*—Fitzpatrick, Cella, Harper & Scinto

(57) ABSTRACT

Two main-scanning-color-group recognition units, each for measuring a degree of continuity of chromatic pixels in a main scanning direction are provided. A degree of continuity in a sub-scanning direction is measured by the degree of continuity of chromatic pixels in the main scanning direction determined by a different threshold.

7 Claims, 16 Drawing Sheets

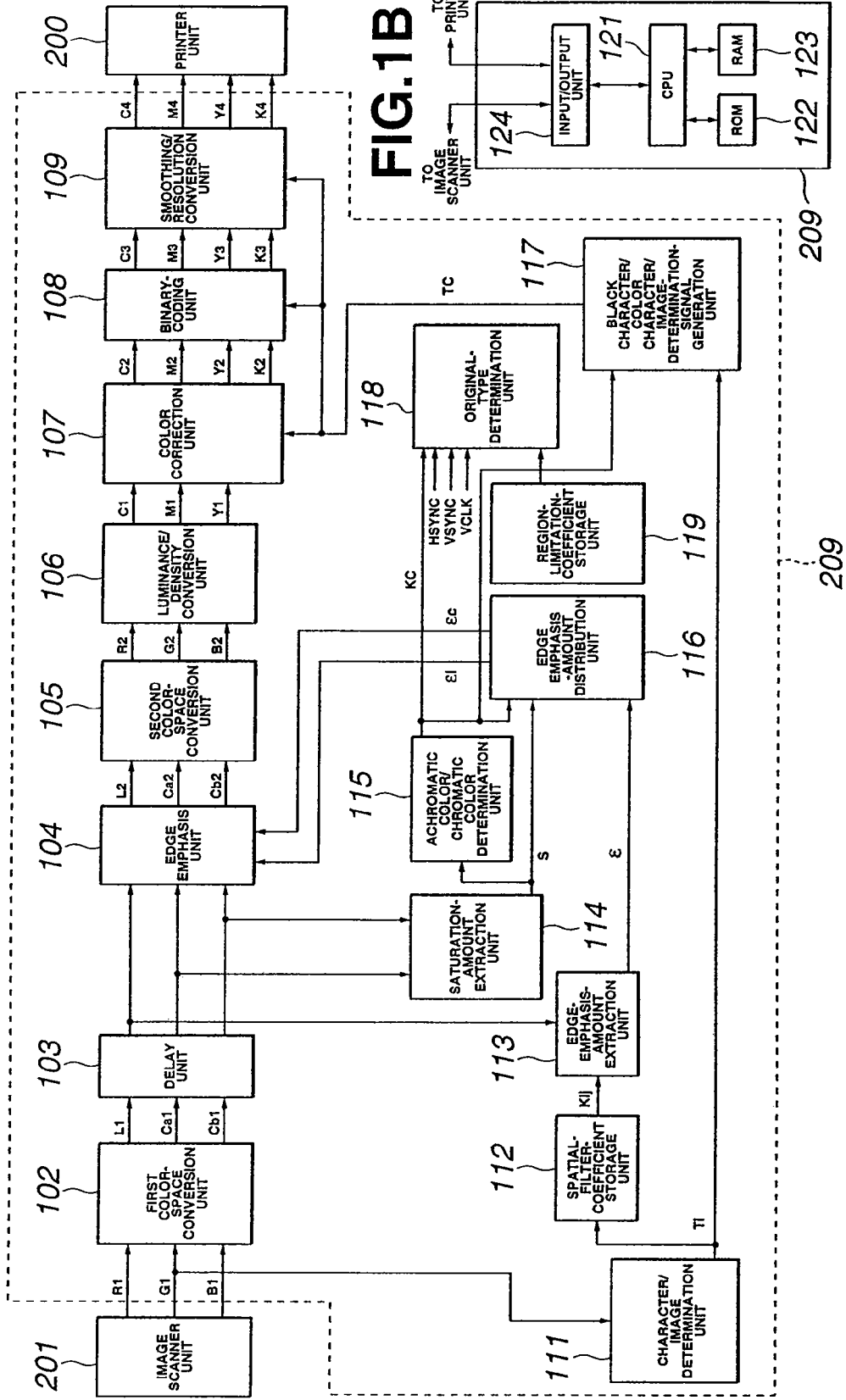

FIG.2A

| -10 | -23 | -22 | -23 | -10 |
|---|---|---|---|---|
| -23 | 10 | 54 | 10 | -23 |
| -22 | 54 | 56 | 54 | -22 |
| -23 | 10 | 54 | 10 | -23 |
| -10 | -23 | -22 | -23 | -10 |

| -4 | -10 | -9 | -10 | -4 |
|---|---|---|---|---|
| -10 | 8 | 34 | 8 | -10 |
| -9 | 34 | -36 | 34 | -9 |
| -10 | 8 | 34 | 8 | -10 |
| -4 | -10 | -9 | -10 | -4 |

$* 1/128$

IMAGE PROCESSING APPARATUS, AND METHOD OF CONTROLLING THE SAME

RELATED APPLICATIONS

This application is a divisional of application Ser. No. 10/014,416, filed Dec. 10, 2001, and claims benefit of both that application and Japanese Patent Application 2000-339325, filed Dec. 12, 2000. The entire contents of both of those prior applications are incorporated herein by reference.

BACKGROUND OF THE INVENTION

1. Field of the Invention

The present invention relates to an image processing apparatus and a method for controlling the same. More particularly, the invention relates to an image processing apparatus having a function of identifying whether an input image is a color image or a monochromatic image, and a method for controlling the image processing apparatus. The invention also relates to an image forming apparatus using the image processing apparatus.

2. Description of the Related Art

In a color image forming apparatus, particularly a color copier, or a color copying apparatus realized by combining a color scanner, a computer and a color printer, or the like, when forming and outputting an image of a monochromatic original, copying is sometimes performed using four colors, i.e., C (cyan), M (magenta), Y (yellow) and K (black). However, in the case of a color copier or a color copying apparatus using a color laser-beam printer, it is desirable to perform copying with a black monochrome for a monochromatic original, in order to increase the life of a drum and reduce the amount of consumption of a toner. The situation is the same in the case of a color copier or a color copying apparatus using a color inkjet printer.

Accordingly, it is desired that a color-image forming apparatus has a function of identifying whether an original is a color original or a monochromatic original. Conventionally, determination of the type of an original is mainly performed according to simple evaluation such that color pixels (pixels determined to be chromatic) of an input original are added, and the added value is statistically evaluated or compared with at threshold.

However, when determining a color pixel based on color components (for example, R, G and B luminance signals) of each pixel of an image of an original read by an original-input device, if a reading element for reading a color component at the same position cannot perform a reading operation at completely the same pixel position, i.e., if reading is performed by being shifted by a very small distance (hereinafter this state is termed "color deviation"), an edge portion of a black line is detected to be chromatic.

Particularly, since, recently, accuracy of reading (resolution) of an image scanner used as an image input device is increasing, the above-described problem often attracts notice.

Even if accuracy of a reading position is sufficient, a color component (a pseudo-color) such as one generated when accuracy in a reading position is insufficient is generated at a position near an edge of a black line, depending on variations in MTF (modulation transfer function) characteristics of a lens at different wavelengths. The fact that the generation of a pseudo-color component due to color deviation or variations in MTF characteristics of a lens will cause no problem when reading an original having a uniform color (for example, white paper) will be understood from the above-described reason.

The problem is that an achromatic pixel is determined to be chromatic due to a pseudo-color generated due to color deviation or variations in MTF characteristics of a lens at a portion near an edge of a black character or a black fine line.

In the above-described conventional processing, however, since the same threshold is used for determining a degree of continuity in a main scanning direction and for determining a group of consecutive color pixels in counting in the main scanning direction and counting in a sub-scanning direction, accuracy of determination cannot be changed between the main scanning direction and the sub-scanning direction. As a result, sometimes, optimum determination reflecting the characteristics of an image scanner and differences among image scanners cannot be performed.

SUMMARY OF THE INVENTION

The present invention has been made in consideration of the above-described problems.

It is an object of the present invention to provide an image processing apparatus which can set a threshold for determining a degree of continuity in a main scanning direction and a threshold for determining a group of consecutive color pixels independently in counting of chromatic pixels in the main scanning direction and a sub-scanning direction, and a method for controlling the image processing apparatus.

It is another object of the present invention to provide an image forming apparatus using an image processing apparatus which can set a threshold for determining a degree of continuity in a main scanning direction and a threshold for determining a group of consecutive color pixels independently in counting in the main scanning direction and a sub-scanning direction, and a method for controlling the image processing apparatus.

According to one aspect, the present invention which achieves these objectives relates to an image processing apparatus that comprises first, second and third determination means. The first determination means is for determining a chromatic pixel string by determining consecutiveness of chromatic pixels on a main scanning line, the second, for determining existence of a chromatic color on the main scanning line in response to detecting a predetermined number of the chromatic pixel strings on the main scanning line, and the third, for determining the chromatic color in a sub-scanning direction by determining the consecutiveness of the chromatic color pixels on the main scanning line. A parameter of the first determination means for the consecutiveness and a parameter of the third determination means for the consecutiveness are set separately.

According to another aspect, the present invention which achieves these objectives relates to an image forming apparatus including the above-described image processing apparatus. Image formation is performed by providing a color image from the image data determined to include the chromatic color by the image processing apparatus, and providing a monochromatic image from image data other than the determined image data.

According to still another aspect, the present invention which achieves these objectives relates to a method for controlling an image processing apparatus for determining whether or not a chromatic color is included within image data having a predetermined number of pixels in each of a first direction and a second direction orthogonal to the first direction. The method includes a first determination step of temporarily determining for each pixel string in the first direction that the pixel string is a chromatic pixel string, when a frequency of appearance of pixels determined to be chromatic according to a predetermined condition consecutively by a first number is larger than a second number, a second determination step of determining a frequency of appearance of the pixel string temporarily determined in the first determination step consecutively by a third number, and a third determination step of determining whether or not a chromatic color is included in the image data, based on a result of determination in the first determination step and a result of determination in the second determination step.

According to yet another aspect, the present invention which achieves these objectives relates to a storage medium, capable of being read by a computer, storing a program for controlling an image processing apparatus for determining whether or not a chromatic color is included within image data having a predetermined number of pixels in each of a first direction and a second direction orthogonal to the first direction. The program includes a program code of a first determination step of temporarily determining for each pixel string in the first direction that the pixel string is a chromatic pixel string, when a frequency of appearance of pixels determined to be chromatic according to a predetermined condition consecutively by a first number is larger than a second number, a program code of a second determination step of determining a frequency of appearance of the pixel string temporarily determined in the first determination step consecutively by a third number, and a program code of a third determination step of determining whether or not a chromatic color is included in the image data, based on a result of determination in the first determination step and a result of determination in the second determination step.

The present invention relates to an image processing apparatus having new functions and a method for controlling the image processing apparatus.

The foregoing and other objects, advantages and features of the present invention will become more apparent from the following detailed description of the preferred embodiment taken in conjunction with the accompanying drawings.

BRIEF DESCRIPTION OF THE DRAWINGS

FIG. 1, consisting of FIGS. 1A and 1B, is a block diagram illustrating an example of the configuration of an image processing apparatus according to an embodiment of the present invention;

FIGS. 2A and 2B are diagrams illustrating spatial-filter coefficients stored in a spatial-filter-coefficient storage unit shown in FIG. 1;

DETAILED DESCRIPTION OF THE PREFERRED EMBODIMENT

A preferred embodiment of the present invention will now be described in detail with reference to the drawings.

Figure 18:
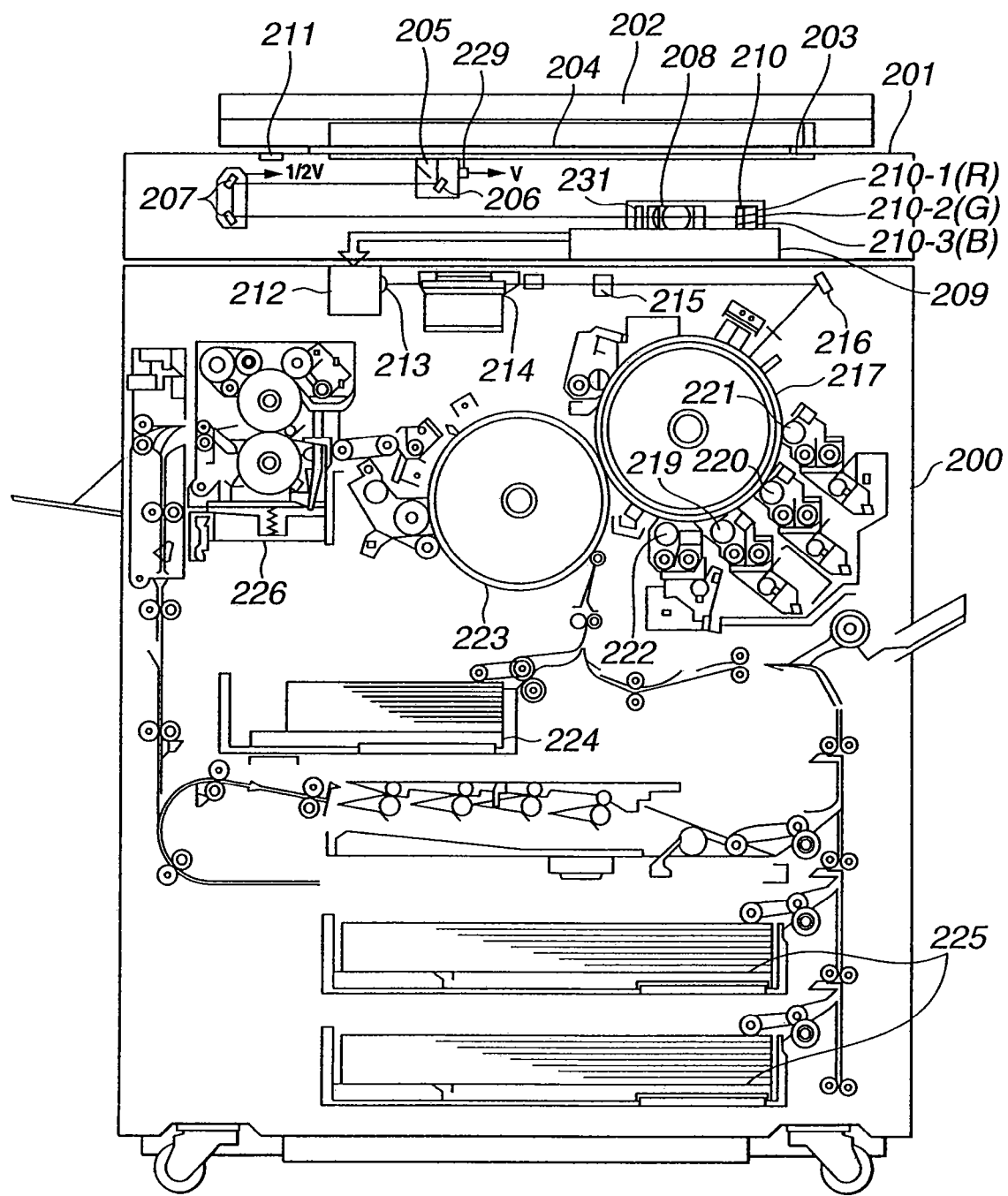
FIG. 18 is a cross-sectional view illustrating an example of the configuration of a color copier, serving as an image forming apparatus to which the image processing apparatus of the embodiment can be applied.

FIG. 18 is a cross-sectional view illustrating an example of the configuration of a color image forming apparatus, serving as an image forming apparatus to which an image processing apparatus according to the embodiment can be applied.

In FIG. 18, an image scanner 201 reads an original 204 mounted on original-mount glass 203 and performs digital processing for a read image of the original 204. A printer unit 200 forms and outputs an image corresponding to the image of the original 204 read by the image scanner unit 201 onto a recording medium, such as paper or the like.

The image scanner 201 includes an original-pressing plate 202, and the original-mount glass (platen) 203. The original 204 is mounted on the original-mount glass 203 in a state in which a recorded surface is placed downward in FIG. 18, and the position of the original 204 is fixed by the original-pressing plate 202. A light source 205 comprises a fluorescent lamp, a halogen lamp, a xenon lamp or the like, and illuminates the recorded surface of the original 204 mounted on the original-mount glass 203. In this embodiment, the light source 205 is assumed to be a fluorescent lamp.

Reflected light from the original 204 is guided to mirrors 206 and 207, converged by a lens 208, and focused onto a photosensing surface of an image reading device, such as a linear CCD (charge-coupled device) image sensor (hereinafter termed a "CCD") 210. The CCD 210 reads the reflected light from the original 204 by decomposing it into red (R), green (G) and blue (B) color components, and transmits read data to an image processing unit 209.

In the CCD 210 of the embodiment, about 7,500 photosensing pixels are arranged along a line for each of the R, G and B components. The CCD 210 can read a shorter side 297 mm long of an A3-size original with a resolution of 600 dpi (dots per inch). In order to read a shorter side of an A3-size original with a resolution of 400 dpi, a one-dimensional image sensor having about 5,000 photosensing pixels for each of the R, G and B components suffices.

By mechanical movement of the fluorescent lamp 205 and the mirror 206 at a speed of v and the mirror 207 at a speed of v/2 in a sub-scanning direction (a direction orthogonal to the arrangement of the CCD 210), the reflected light is focused on and read by the CCD 210 after passing through a predetermined distance.

Reference numeral 211 represents a reference white plate having a uniform chromaticity. The reference white plate 211 is used for calculating a reference chromaticity value for correcting unevenness in shading by the lens 208 and unevenness in the sensitivity of each photosensing pixel.

Although the details of the image processing unit 209, serving as the image processing apparatus according to the embodiment, will be described later, a signal obtained from the CCD 210 is converted into a digital signal, and yellow (Y), magenta (M), cyan (C) and black (Bk) color-component images corresponding to ink colors at printing are formed and transmitted to the printer unit 200. By transmitting one of the Y, M, C and Bk color-component images to the printer unit 200 at every original-scanning operation (corresponding to one sub-scanning operation) by the image scanner unit 201, i.e., by performing four scanning operations and sequentially transmitting image signals representing recording color components obtained at the respective scanning operations to the printer unit 200, one printing processing is completed. If the image processing unit 209 incorporates a memory having a necessary and sufficient capacity, by storing a result of one scanning/reading operation (a result of four scanning operations) in the memory, a single transmission operation to the printer unit 200 suffices.

The Y, M, C and Bk image signals transmitted from the image processing unit 209 in the above-described manner are transmitted to a laser driver 212 within the printer unit 200. The laser driver 212 outputs a laser beam by causing a laser diode to emit light in accordance with the image signal of each pixel. The laser beam scans the surface of a photosensitive drum 217 via a polygonal mirror 214, an f-θ lens 215, and a mirror 216.

Developing units 219-222 develop electrostatic latent images corresponding to respective color components using yellow, magenta, cyan and black developers (toners or the like). The four developing units 219-222 sequentially contact the photosensitive drum 217, and develop the electrostatic latent images on the photosensitive drum 217 formed by the above-described irradiation of the laser beam by sequentially contacting the photosensitive drum 217, using corresponding color toners.

Reference numeral 223 represents a transfer drum. A recording sheet fed from a sheet cassette 224 or 225 is wound around the transfer drum 223 by being attracted by static electricity, and a toner image developed on the photosensitive drum 217 is transferred onto the recording sheet. In recording processing using four color components, toners of respective color components are transferred in a superposed state by four rotations of the transfer drum 223. Then, the recording sheet is separated from the transfer drum 223 by a separation pawl, is then conveyed to and fixed in a fixing unit 226, and is discharged to the outside of the apparatus.

An outline of the operation of the color copier shown in FIG. 18 has been described.

As shown in FIG. 18, in order to perform recording on the back of the recording sheet or multiplex recording, a branch conveying channel is provided at a discharging port. By again receiving the recording sheet into the apparatus via the conveying channel, it is possible to perform recording on the back of the recording sheet, multiplex recording or the like.

(Configuration of the Image Processing Unit)

FIG. 1A is a block diagram illustrating the functional configuration of the image processing unit 209 shown in FIG. 18.

A G1 signal among three-color separation signals R1, G1 and B1 of an image read by the image scanner unit 201 is input to a character/image determination unit 111. The character/image determination unit 111 determines from the G1 signal whether a target pixel represents a line image comprising a character, a line or the like, or a gradation image comprising a photograph, a printed image or the like, and outputs the result of determination as a character/image determination signal TI.

The character/image determination unit 111 extracts for example, a G-component signal for about 3×3 pixels (this region may be appropriately changed depending on the resolution of reading), calculates the difference between a maximum value and a minimum value in the extracted signal, and performs determination depending on whether or not the difference is at least a predetermined value. This determination utilizes the phenomenon that the difference (a change in luminance) is large at a portion near an edge of a character or a line, and is small in the case of an intermediate image. In order to discriminate a printed image, determination can be performed based on correspondence between characteristics of an image and spatial-frequency characteristics by expanding the region including 3×3 pixels.

The character/image determination signal TI is output to a black character/color character/image-determination-signal generation unit 117 and a spatial-filter-coefficient storage unit 112. The spatial-filter-coefficient storage unit 112 comprises, for example, a ROM (read-only memory) or the like. When the target pixel represents a character or a line image (for example, TI="1"), or gradation (an intermediate image) (for example, TI="0"), spatial-filter coefficients for characters or spatial-filter coefficients for a gradation image are selected and output, respectively.

FIGS. 2A and 2B are diagrams illustrating examples of spatial-filter coefficients Kij for characters and spatial-filter coefficients Kij for a gradation image, respectively, stored in the spatial-filter-coefficient storage unit 112. Although a DC component of a conventional spatial filter for characters or a gradation image is "1", a DC component of a spatial filter for characters or a gradation image according to the embodiment shown in FIG. 2A or 2B, respectively, is set to "0". That is, for a flat image having no edge component, although in conventional spatial filtering, an input image value is output without being modified, an output value after spatial filtering processing according to the embodiment is "0".

Returning to FIG. 1A, three-color separation signals R1, G1 and B1 of a color image are input to a first color-space conversion unit 102 to be converted into a lightness signal L1 representing brightness and chromaticity signals (Ca1, Cb1) representing a hue. The lightness signal L1 and the chromaticity signals (Ca1, Cb1) may be colorimetric variables, such as three variables L1, a* and b* in the CIE (Commission Internationale de l'Eclairage) 1976 (L*a*b*) color space or three variables L*, u* and v* in the CIE 1976 (L*u*v*) color space, or variables in an arbitrary color space which is simply defined. In this embodiment, variables L1, Ca1 and Cb1 are used because these variables can be simply converted from the three-color separation signals R, G and B.

The following Equation (1) is a conversion equation for converting three-color separation signals R, G and B into lightness and chromaticity signals L1, Ca1 and Cb1:

$$L=(R+2G+B)/4$$

$$Ca=(R-G)/2$$

$$Cb=(R+G-2B)/4.  \quad \text{Equation (1)}$$

The lightness signal L1 and the chromaticity signals (Ca1, Cb1) obtained by conversion by the first color-space conversion unit 102 are input to a delay unit 103. The delay unit 103 stores lightness signals L1 for N lines, and chromaticity signals (Ca1, Cb1) for (N/2) lines. More specifically, when performing spatial-filtering processing for 5×5 pixels, lightness signals L1 for past 4 lines, and a lightness signal L1 for the current line, i.e., data for 5 lines, are input to an edge emphasis-amount extraction unit 113. At that time, chromaticity signals for past 4/2=2 lines and for the current line, i.e., data for three lines, are input to a saturation-amount extraction unit 114.

The edge-emphasis-amount extraction unit 113 calculates lightness signals for a block comprising 5×5 pixels using spatial-filter coefficients Kij (depending on the character/image determination signal T1) output from the spatial-filter-coefficient storage unit 112, to obtain an amount of edge emphasis ε of the target pixel (a pixel at a central position within the block comprising 5×5 pixels), and outputs the obtained value.

When lightness signals for the 5×5 pixels are represented by L1$ij$ (i=1-5, and j=1-5), the amount of edge emphasis ε is obtained according to the following equation:

$$\epsilon = \Sigma L1ij \times Kij/C,$$

where C is a normalization constant for normalizing a component subjected to edge emphasis.

The amount of edge emphasis ε is supplied to an edge-emphasis-amount distribution unit 116. The edge-emphasis-amount distribution unit 116 generates an amount of edge emphasis ε1 for the lightness signal L1 and a correction amount of edge emphasis εc for the chromaticity signals (Ca1, Cb1) based on the amount of edge emphasis ε, a saturation signal S from the saturation-amount extraction unit 114, and a determination signal KC from an achromatic color/chromatic color determination unit 115 (to be described later), and outputs the generates values to an edge emphasis unit 104.

Although not illustrated in FIG. 1, the chromaticity signals (Ca1, Cb1) delayed by the delay unit 103 are input to the saturation-amount extraction unit 114 as data for three lines, i.e., delayed two lines and the current line. The saturation-amount extraction unit 114 which has received the data generates and outputs a saturation signal S representing clearness of a color.

A method for generating the saturation signal S from the chromaticity signals (Ca1, Cb1) will now be briefly described. When the chromaticity signals (Ca1, Cb1) are signals (a*, b*) in the CIE 1976 (L*, a*, b*) color space or signals (u*, v*) in the CIE 1976 (L*, u*, v*) color space, the saturation signal S is expressed according to the following Equation (2):

$$S=(Ca1^2+Cb1^2)^{0.5} \quad \text{Equation (2)}.$$

More simply, the saturation signal S may be expressed by the following Equation (3):

$$S=\text{MAX}(Ca1,Cb1) \quad \text{Equation (3)},$$

where a function MAX (A, B) outputs one of variables A and B which has a larger absolute value.

In addition to the amount of edge emphasis ε and the saturation signal S which have been described above, the determination signal KC from the achromatic color/chromatic color determination unit 115 is also input to the edge-emphasis-amount distribution unit 116.

The achromatic color/chromatic color determination unit 115 determines whether a concerned pixel is a black-and-white pixel (an achromatic color) or a color pixel (a chromatic color), and outputs the determination signal KC. In this embodiment, an input signal to the achromatic color/chromatic color determination unit 115 is the saturation signal S indicating clearness of a color. Whether or not the pixel is achromatic or chromatic is determined by this saturation signal S.

Since as described above, the saturation signal S is generated by the saturation-amount extraction unit 114 based on the chromaticity signals (Ca1, Cb1) for three lines, i.e., two lines delayed by the delay unit 103 and the current line, the saturation signal S and the chromaticity signals (Ca1, Cb1) which are original signals of the saturation signal S may be input to the achromatic color/chromatic color determination unit 115 (in this case, the signal lines of the chromaticity signals (Ca1, Cb1) connected to the saturation-amount extraction unit 114 shown in FIG. 1 are extended to the achromatic color/chromatic color determination unit 115 together with the saturation signal S).

Figure 8:
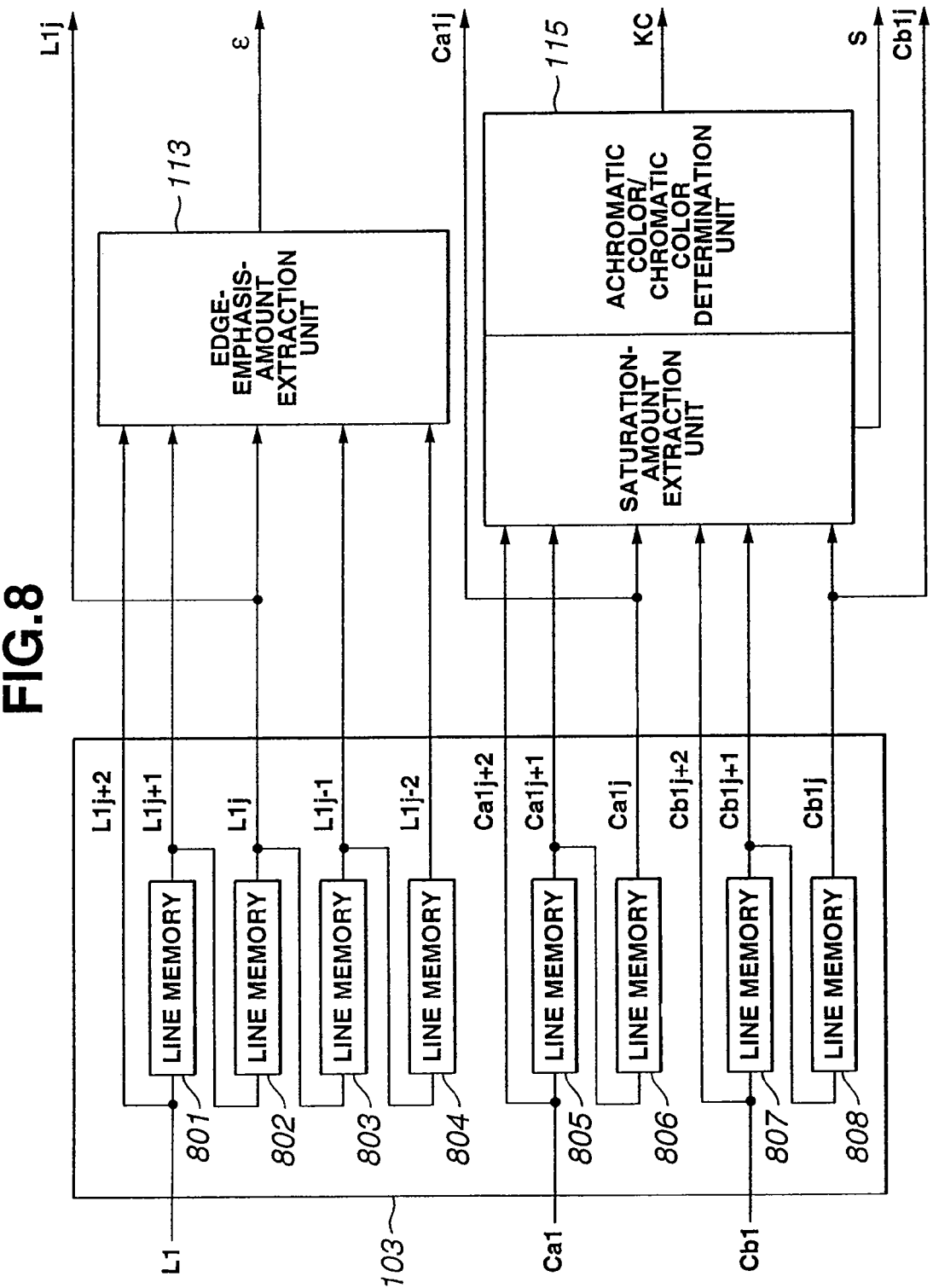
FIG. 8 is a block diagram illustrating an example of the configuration of a delay unit shown in FIG. 1 and connection of the delay unit with other related units.

The delay unit 103 of the embodiment and the edge-emphasis-amount extraction unit 113, the saturation-amount extraction unit 114 and the achromatic color/chromatic color determination unit 115 provided around the delay unit 103 will now be described in detail with reference to FIG. 8.

As for the lightness signal L1 and the chromaticity signals (Ca1, Cb1) output from the first color-space conversion unit 102, the lightness signal L1 is stored in line memories 801-804 of the delay unit 103 in a state of being synchronized with a central pixel of the lightness signal L1, and chromaticity signals Ca1 for two lines and chromaticity signals Cb1 for two lines are stored in the line memories 805 and 806, and the line memories 807 and 808, respectively.

If the j-th line is assumed to be the central line, lightness signals L1 for (j−2)-th, (j−1)-th, j-th and (j+1)-th lines are stored, so that lightness signals L1 for five lines, i.e., the current line and preceding and succeeding two lines, are input to the edge-emphasis-amount extraction unit 113.

The edge-emphasis-amount extraction unit 113 forms data after edge emphasis (the amount of edge emphasis ε) based on lightness signals for 5×5 pixels from the delay unit 103 and filter coefficients for 5×5 pixels from the spatial-filter-coefficient storage unit 112. Accordingly, the edge-emphasis-amount extraction unit 113 can be configured by 25 multipliers and 24 adders in consideration of the above-described equation.

The chromaticity signals Ca1 and Cb1 for the j-th and (j+1)-th lines are stored in the line memories 805 and 806, and 807 and 808, respectively, and chromaticity signals Ca1 and Cb1 for three lines, i.e., the current line and immediately preceding and succeeding lines, are supplied to the saturation-amount extraction unit 114 and the achromatic color/chromatic color determination unit 115.

In this embodiment, when calculating the saturation signal S or the achromatic color/chromatic color determination signal KC according to the above-described Equation (2) or (3), spatial processing may be performed using data for three lines, i.e., the j-th, (j+1)-th and (j+2)-th lines. For example, by averaging saturation signals S for adjacent pixels (8 pixels) surrounding the target pixel in a region comprising 3×3 pixels, the mean value may represent the saturation signal S. Similarly, by statistically processing a result of determination for adjacent pixels in a region comprising 3×3 pixels, a representative value may represent the achromatic color/chromatic color determination signal KC.

(Calculation of the Color Determination Signal KC)

Next, a method for calculating the determination signal KC using the obtained saturation signal S will be described.

It is assumed that when the saturation signal S has a small value, the concerned pixel is a black-and-white pixel, and when the saturation signal S has a large value, the concerned pixel is a color (chromatic color) pixel. Accordingly, the determination signal KC can be simply determined according to the following Equation (4) using a predetermined threshold $\rho$:

(when S<$\rho$) KC=achromatic color (when S≧$\rho$) KC=chromatic color           Equation (4).

(Generation of the Edge-Emphasis Correction Amount for the Lightness Signal)

A description will now be provided of processing for generating edge-emphasis correction amounts $\epsilon 1$ and $\epsilon c$ based on the amount of edge emphasis $\epsilon$, the saturation signal S and the determination signal KC which have been input to the edge-emphasis-amount distribution unit 116.

First, distribution of the edge-emphasis correction amount $\epsilon$ for the lightness signal L1 is made large, and the entire amount of edge emphasis $\epsilon$ is allocated to $\epsilon 1$ for an achromatic-signal pixel. For a pixel having a saturation equal to or more than a predetermined value, edge correction for the lightness signal is not performed.

This processing will now be described with reference to the flowchart shown in FIG. 3 and the schematic diagram shown in FIG. 4.

Figure 3:
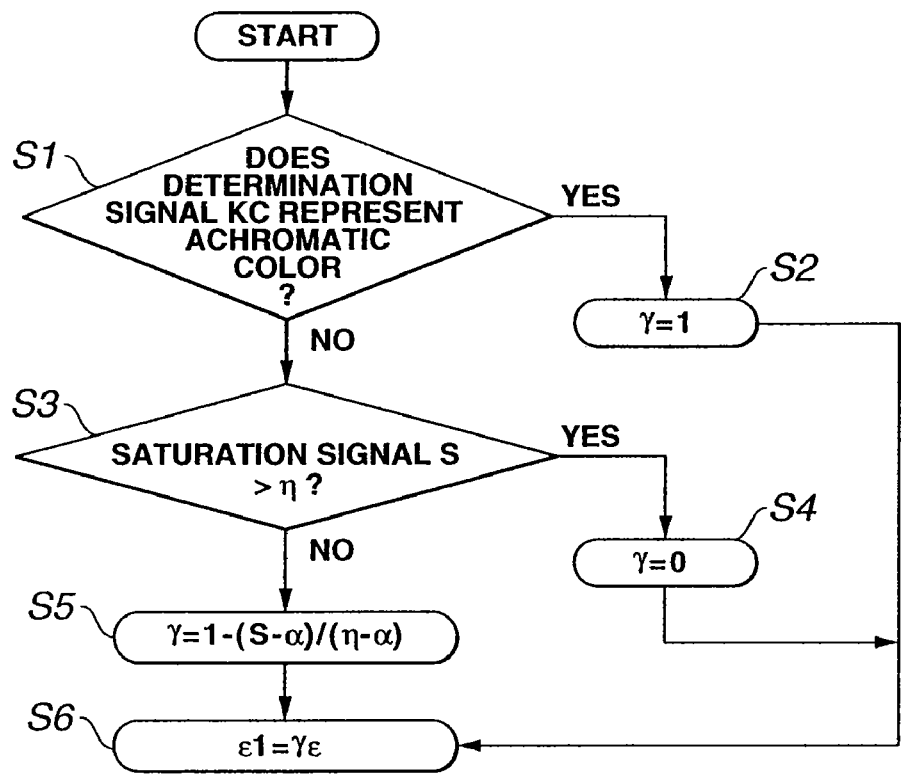
FIG. 3 is a flowchart illustrating processing of generating an edge-emphasis correction amount for a lightness signal performed by an edge-emphasis-amount distribution unit shown in FIG. 1.

In step S1 shown in FIG. 3, branching is performed in accordance with the achromatic color/chromatic color determination signal KC for the target pixel. When the determination signal KC indicates an achromatic color (when the determination in step S1 is YES), the process proceeds to step S2, where in order to allocate the entire amount of edge emphasis $\epsilon$ to $\epsilon 1$, "1" is allocated to a multiplication coefficient $\gamma$. Then, in step S6, setting of $\epsilon 1=\gamma \epsilon$ is performed, i.e., e is allocated to $\epsilon 1$.

When the determination signal KC indicates a chromatic color in step S1, it is then determined if the saturation signal S is larger than a predetermined value (step S3). If the result of the determination in step S3 is affirmative, "0" is allocated to the multiplication coefficient $\gamma$ (step S4). Then, the process proceeds to step S6, where $\gamma \epsilon$, i.e., "0", is allocated to $\epsilon 1$.

If the result of the determination in step S3 is negative, it indicates that it is difficult to determine whether the target pixel is chromatic or achromatic. Hence, the process proceeds to step S5 and then to step S6, where the multiplication coefficient $\gamma$ and $\epsilon 1$ are determined according to the following Equation (5), respectively:

$\gamma=(1-(S-\alpha)/(\eta-\alpha))$ $\epsilon 1=(1-(S-\alpha)/(1-\alpha))\epsilon$           Equation (5).

Figure 4:
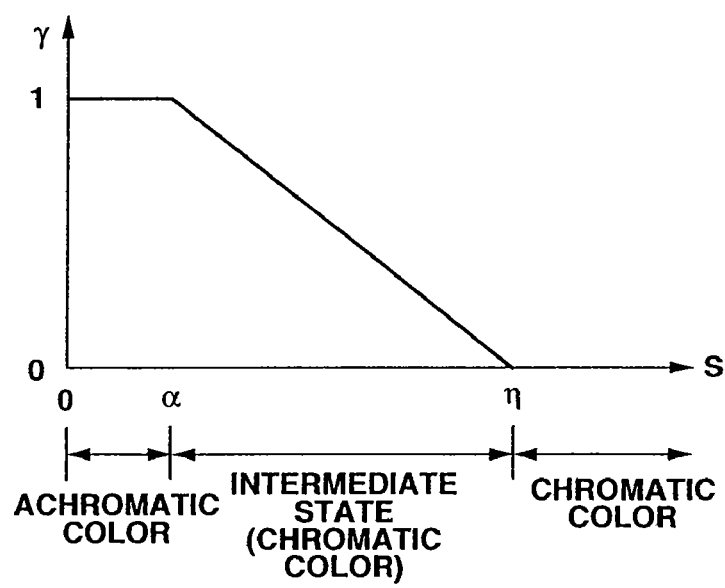
FIG. 4 is a graph illustrating an amount of correction of edge emphasis, based on the processing shown in FIG. 3.

By performing the above-described processing, the relationship among $\alpha$, $\eta$ and $\gamma$ is as shown in FIG. 4. That is, when it can be determined that the concerned pixel is substantially achromatic or chromatic, $\gamma$ is "1" or "0", respectively. At an intermediate state, $\gamma$ has a value between 0 and 1 (i.e., a decimal fraction) in accordance with the saturation signal S.

(Generation of the Edge-Emphasis Correction Amount for the Chromaticity Signals)

Next, a description will be provided of the edge-emphasis correction amount $\epsilon c$ for the chromaticity signals (Ca1, Cb1).

Basically, for the chromaticity signal, in contrast to the case of the lightness signal, distribution of the amount of edge emphasis $\epsilon$ for the chromaticity signals is made larger as the saturation is larger (a clearer color). Edge correction is not performed and the chromaticity signal is removed for an achromatic pixel.

This is because in an image forming apparatus, such as a color copier or the like, if color components remain in a copied image comprising black characters or the like, the quality of the image is visually degraded. In other words, it is necessary to cut color components for such pixels and perform color correction to provide a complete achromatic signal.

Such processing will now be described with reference to the flowchart shown in FIG. 5 and the schematic diagram shown in FIG. 6.

Figure 5:
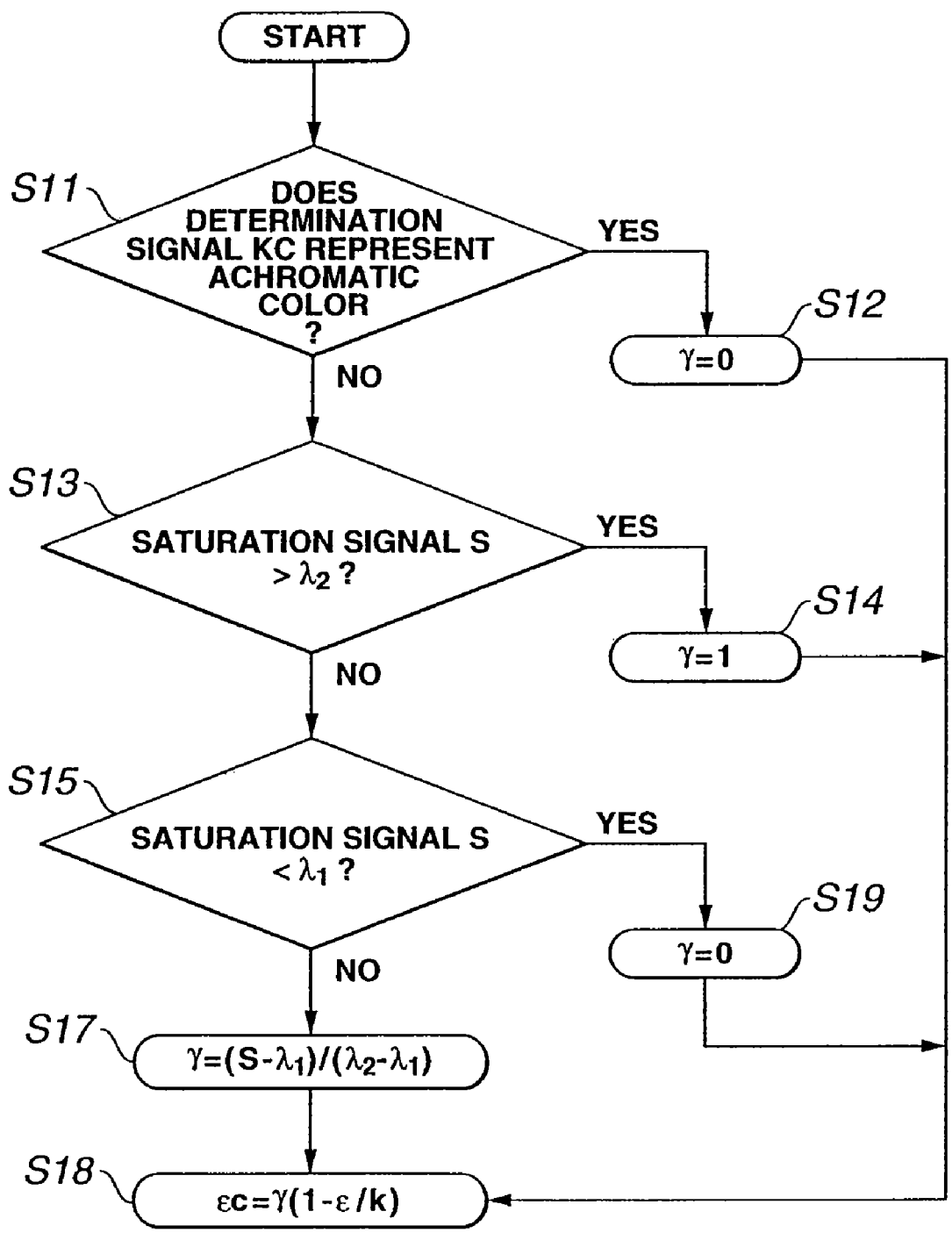
FIG. 5 is a flowchart illustrating processing of generating an amount of correction of edge emphasis for a chromaticity signal performed by the edge-emphasis-amount distribution unit shown in FIG. 1.

In step S11 shown in FIG. 5, first, processing for the target pixel is switched in accordance with the achromatic color/chromatic color determination signal KC. That is, when the determination signal KC indicates an achromatic color (when the result of determination in step S11 shown in FIG. 5 is YES), in order to set the amount of edge emphasis $\epsilon c$ to 0 as described above, the multiplication coefficient $\gamma$ is set to 0 in step S12. Then, by performing calculation in step S18, the amount of edge emphasis $\epsilon c$ is set to 0.

If the result of the determination in step S11 is NO, the process proceeds to step S13, where the saturation signal S is compared with a threshold $\lambda 2$. When S>$\lambda 2$, the process proceeds to step S14, where the multiplication coefficient $\gamma$ is set to 1. Then, the process proceeds to step S18, where $\epsilon c$ is set to $\gamma(1-\epsilon/\kappa)$.

If it is determined in step S13 that S>$\lambda 2$, the process proceeds to step S15, where the saturation S is compared with $\lambda 1$ to determine if S<$\lambda 1$. If the result of the determination in step S15 is YES, it indicates that the target pixel can be determined to be achromatic. Hence, the process proceeds to step S19, where the multiplication coefficient $\gamma$ is set to 0, to set $\epsilon c$ to 0.

If the result of the determination in step S15 is NO, the process proceeds to step S17, where in order to set the multiplication coefficient $\gamma$ to a value corresponding to the saturation signal S (a value between 0 and 1), the multiplication coefficient $\gamma$ is determined according to the following Equation (6):

$\gamma=(S-\lambda 1)/(\lambda 2-\lambda 1)$           Equation (6).

Then, in step S18, the amount of edge emphasis $\epsilon c$ for the chromaticity signal is obtained according to the following Equation (7):

$\epsilon c=\gamma(1-\epsilon/\kappa)$           Equation (7), where $\kappa$ is a normalization coefficient.

Figure 6:
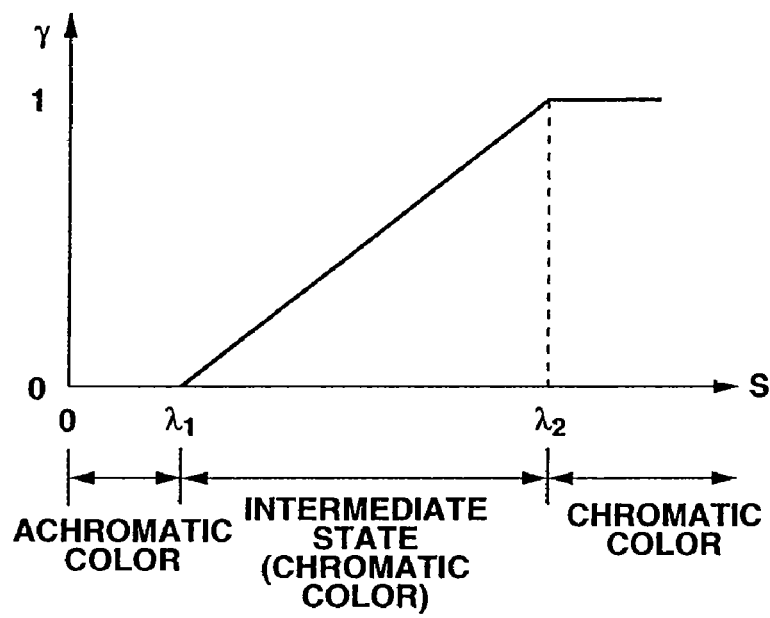
FIG. 6 is a graph illustrating an amount of correction of edge emphasis, based on the processing shown in FIG. 5.

As a result, the multiplication coefficient $\gamma$ has a value corresponding to the chromaticity signal S as shown in FIG. 6.

That is, while the concerned pixel is achromatic (less than the threshold $\lambda1$), the multiplication coefficient $\gamma$ is "0", and $\epsilon c=0$. While the saturation S is between the thresholds $\lambda1$ and $\lambda2$, $\gamma=(S-\lambda1)/(\lambda2-\lambda1)$, i.e., the value of $\gamma$ continuously increases as the saturation S increases. When the saturation S is larger than the threshold $\lambda2$, then $\gamma=1$. Hence, $\epsilon c=1-\epsilon/\kappa$.

The amounts of correction of edge emphasis $\epsilon1$ and $\epsilon c$ generated in the above-described manner are supplied to an edge emphasis unit 104 together with L, Ca and Cb signals.

The edge emphasis unit 104 adds the amount of correction of edge emphasis $\epsilon1$ to the lightness signal L from the delay unit 103, and performs processing of multiplying the chromaticity signals Ca and Cb by the amount of correction of edge emphasis $\epsilon c$, to generate signals L2, Ca2 and Cb2. That is:

$$L2=\epsilon1+L1$$

$$Ca2=\epsilon\times Ca1$$

$$Cb2=\epsilon\times Cb1 \qquad \text{Equation (8)}.$$

As can be understood from Equation (8), by adding the amount of correction of edge emphasis $\epsilon1$ to the signal L, a state of $\epsilon1=0$ is obtained for a pixel having a high saturation whose edge is not to be emphasized, so that the lightness is preserved.

On the other hand, by multiplying the signals Ca and Cb by the amount of correction of edge emphasis $\epsilon c$, the value of $\epsilon c$ gradually decreases as the saturation is smaller, i.e., the concerned pixel is closer to achromatic. When the pixel is substantially achromatic, a state of $\epsilon c=0$ is obtained. That is, control is performed such that as the value of the saturation is lower, the chromaticity component of the target pixel is more easily removed.

A description will now be provided of preservability of a hue in edge emphasis of a chromaticity signal.

Figure 7:
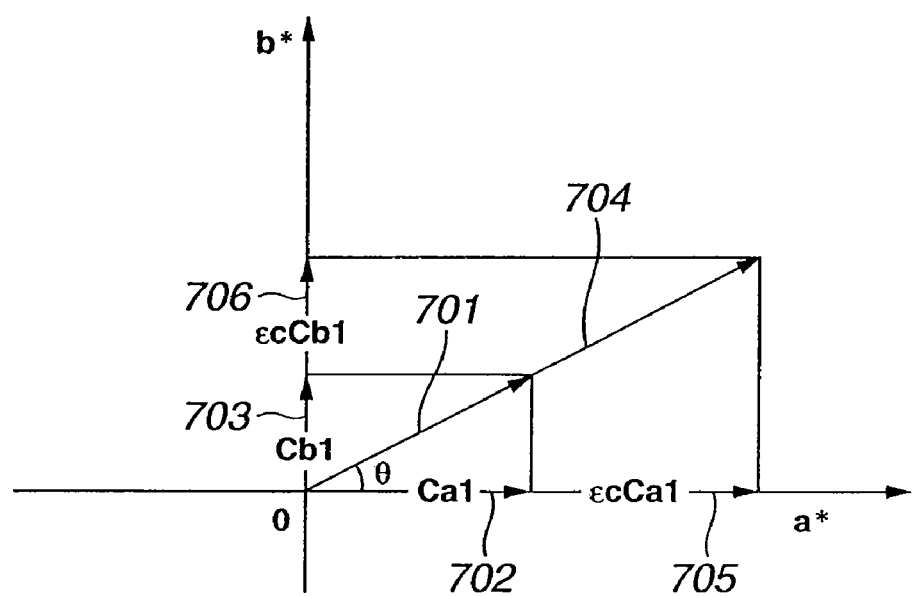
FIG. 7 is a graph illustrating the fact that a hue is preserved before and after edge emphasis of a chromaticity signal in the embodiment.

FIG. 7 illustrates chromaticity coordinates in which coordinate axes represent chromaticity signals (Ca1, Cb1). In order to simplify explanation, Ca and Cb axes are assumed to be a* and b* axes in the CIE 1976 (L*, a*, b*) color space.

The point of intersection 0 of the a* and b* axes represents an achromatic color. The saturation is higher as the distance from the point of intersection 0 is larger. The angle $\theta$ with the a* axis represents hue. The direction perpendicular to the plane of FIG. 7 represents the lightness L*.

When the target pixel has chromaticity signals Ca1 (702) and Cb1 (703), the color of the pixel is represented by a vector 701 on the chromaticity coordinates. By multiplying the chromaticity signals (Ca1, Cb1) by the amount of correction of edge emphasis $\epsilon c$ according to Equation (8), generated signals (Ca2, Cb2) after edge emphasis are $\epsilon c Ca1$, $\epsilon c Cb1$, and therefore are represented by a vector 704 on the chromaticity coordinates. As shown in FIG. 7, the angle $\theta$ with the a* axis is invariable, indicating that the hue has not changed. That is, it can be understood that although clearness is emphasized, the hue is not substantially influenced.

When edge emphasis processing has been performed in the above-described manner, the obtained signals L2, Ca2 and Cb2 are supplied to a second color-space conversion unit 105, to be subjected to inverse conversion to R, G and B values.

The following Equation (9) illustrates examples of conversion equations for converting the lightness signal L2 and the chromaticity signals Ca2 and Cb2 into three-color separation signals R2, G2 and B2. Equation (9) is obtained from the above-described Equation (1):

$$R2=(4L+5Ca+2Cb)/4$$

$$G2=(4L-3Ca+2Cb)/4$$

$$B2=(4L+Ca-6Cb)/4 \qquad \text{Equation (9)}.$$

The three-color separation signals subjected to inverse conversion into the R2, G2 and B2 signals are input to a luminance/density conversion unit 106, to be converted into density signals C1, M1 and Y1, respectively. Since conversion from the RGB color system into the CMY color system is known, a conversion method will not be described.

Then, a color correction unit 107 performs background removal (known as UCR processing) for the density signals C1, M and Y1, generates a black-component signal K, performs color processing, such as under-color removal, color correction and the like, and outputs density signals C2, M2, Y2 and K2.

In this embodiment, the color correction unit 107 performs the above-described processing in accordance with a TC signal from a black character/color character/image-determination-signal generation unit 117.

The black character/color character/image-determination-signal generation unit 117 inputs the color determination signal KC indicating the result of determination by the above-described achromatic color/chromatic color determination unit 115, and the TI signal indicating the result of determination of the character/image determination unit 111, and generates the above-described TC signal.

For example, for an image signal, color correction in which attention is paid to color reproducibility of highlight portions is performed, and for a color-character or black-character image, color correction in which reproduction of highlight portions is removed by neglecting a background color is performed. A binary-coding unit 108 transmits C3, M3, Y3 and K3 signals obtained by performing binary coding of a multi-value image using known error diffusion processing. Then, a smoothing/resolution conversion unit 109 performs edge correction processing represented by notch processing, by referring to the determination signal TI indicating the result of determination of the character/image determination unit 111 and converting a portion of TI=1 (a character portion) into high-resolution data in the main scanning direction or the sub-scanning direction.

The smoothing/resolution conversion unit 109 can also control the entire function in accordance with an instruction through an operation unit (not shown) or, an image processing mode (for example, for a photograph or for characters).

By performing the above-described processing and outputting C4, M4, Y4 and K4 signals output from the smoothing/resolution conversion unit 109 to the printer unit 200, a color image is printed and recorded.

The above-described image processing which is a feature of this embodiment is performed, for example, for an image subjected to pre-scanning and back-scanning (a reading operation in a process of returning to a home position after first scanning an original by a pre-scanning operation of a fluorescent lamp) executed before a copying operation in processing of a color copier. If the image forming apparatus incorporates a page memory, it is also possible to determine the type of an original in an ordinary reading sequence, without performing pre-scanning.

An original-type determination unit 118 will now be described in detail with reference to FIGS. 9-17. The original-type determination unit 118 performs final determination by recognizing a pixel signal output from the above-described achromatic color/chromatic color determination unit 115 with the determination signal KC indicating a chromatic color, in the main scanning direction and the sub-scanning direction.

Figure 9:
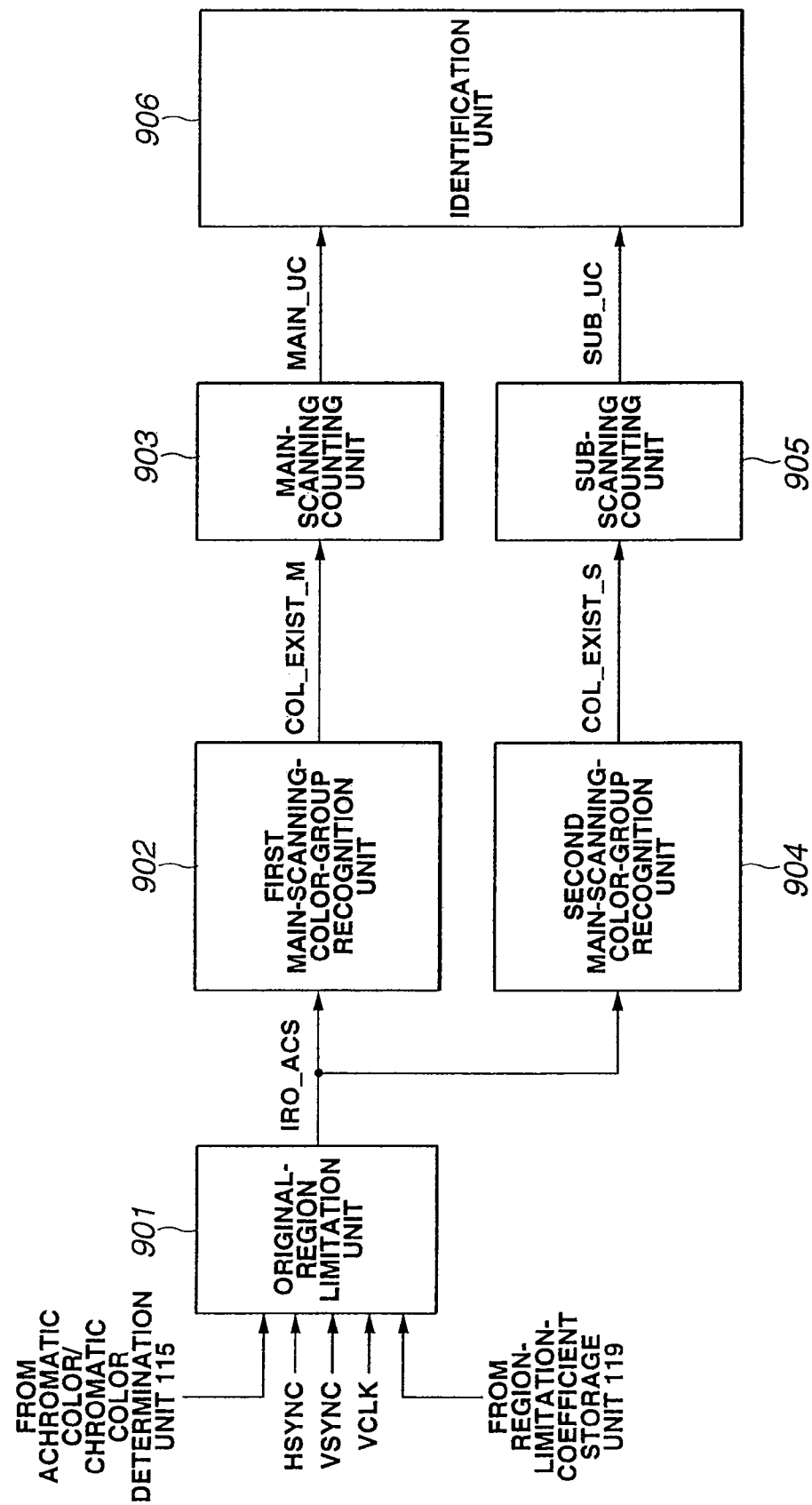
FIG. 9 is a block diagram illustrating an example of the configuration of an original-type determination unit shown in FIG. 1.

FIG. 9 is a block diagram illustrating an example of the configuration of the original-type determination unit 118 in this embodiment.

In this embodiment, the original-type determination unit 118 determines if the original is a monochromatic original or a color original by sequentially calculating color determination signals KC output from the achromatic color/chromatic color determination unit 115.

Figure 19:
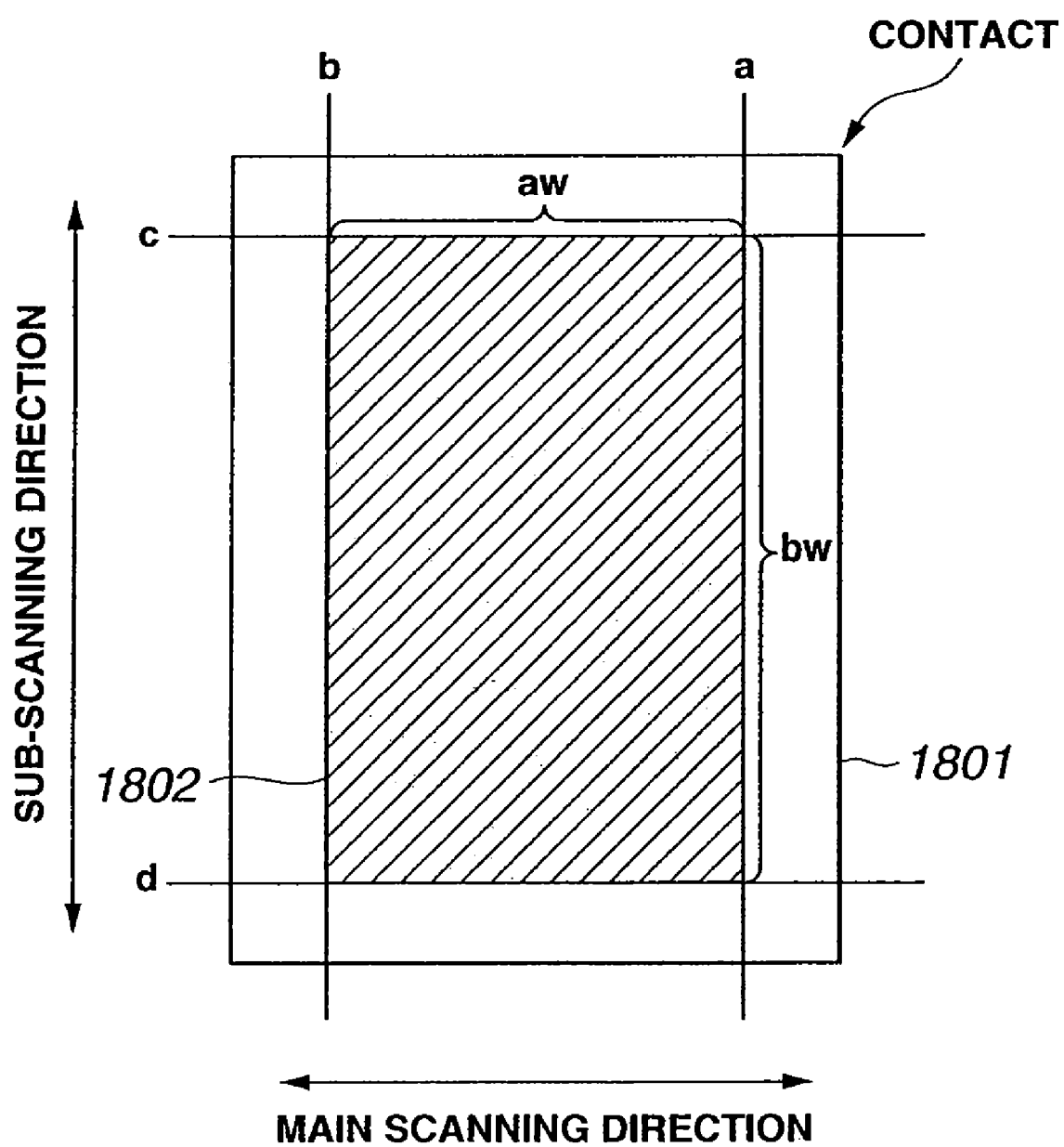
FIG. 19 is a diagram illustrating an example of an original-reading region limited by an original-region limitation unit shown in FIG. 9.

First, achromatic color/chromatic color determination signals KC sequentially transmitted from the achromatic color/chromatic color determination unit 115 are limited by an original-region limitation unit 901 depending on whether the signal represents an effective region for executing determination of the type of the original. As shown in FIG. 19, the original-region limitation unit 901 provides limitation for the entire reading region of the original 1801, such as (a, b) in the main scanning direction and (c,d) in the sub-scanning direction, in accordance with region limitation coefficients stored in a region-limitation-coefficient storage unit 119. Thus, a determination signal corresponding to a hatched portion 1802 shown in FIG. 19 is input to succeeding processing as an effective determination signal KC.

At that time, limitation of a region in the main scanning direction may be performed by providing the address b of the final point after providing the address a of the start point, or by providing the address a of the start point and a width of detection aw in the main scanning direction, because the same effect is obtained by any of the two approaches.

Limitation of a region to be detected is accomplished by providing the address c of the start point of sub-scanning and the address d of the final point for limiting a region in the sub-scanning direction. At that time, although a region in the sub-scanning direction may be limited by a width bw in the sub-scanning direction after providing the starting point c as in the case of the main scanning direction, a region in the sub-scanning direction may also be limited by the size of the original instructed by the operator in a copying operation, or in accordance with the result of detection of the original by an automatic document feeder (ADF or RDF) or the like which is not described in the embodiment.

The addresses for limiting a region are stored in the region-limitation-coefficient storage unit 119 as described above, and a region is limited by a count value of an internal counter (not shown), for example, based on a main-scanning synchronizing signal HSYNC capable of recognizing a main-scanning line, a sub-scanning synchronizing signal VSYNC, and a video clock signal VCLK synchronized for every pixel.

Accordingly, the original-region limitation unit 901 transmits the KC signal without modifying it if the count value is within a predetermined region (the region of determination 1802), and transmits the KC signal as an achromatic signal in order to prevent from being determined if the signal represents a region outside of the region of determination.

Determination of the type of the original is performed by limiting a region in the above-described manner, in order to prevent erroneous determination due to reception of oscillation peculiar to the scanner at a start point or an end portion of the image of the original when the scanner reads the original, or due to color deviation (for example, coloring of an edge of a black fine line) in the read signal because an end portion in main scanning is influenced by an MTF difference or an aberration of a lens, resulting in erroneous determination (for example, determination of a monochromatic original as a color original by detecting the color of an edge of a black fine line within the original).

This embodiment has the feature that final determination is performed based on the results of determination of a signal subjected to region limitation in the main scanning direction (by a main-scanning counting unit) and in the sub-scanning direction (by a sub-scanning counting unit).

(Processing of Determination in the Main Scanning Direction)

First, a description will be provided of processing by a main-scanning counting unit 903 for determining whether or not a chromatic color is present in the main scanning direction.

Figure 10:
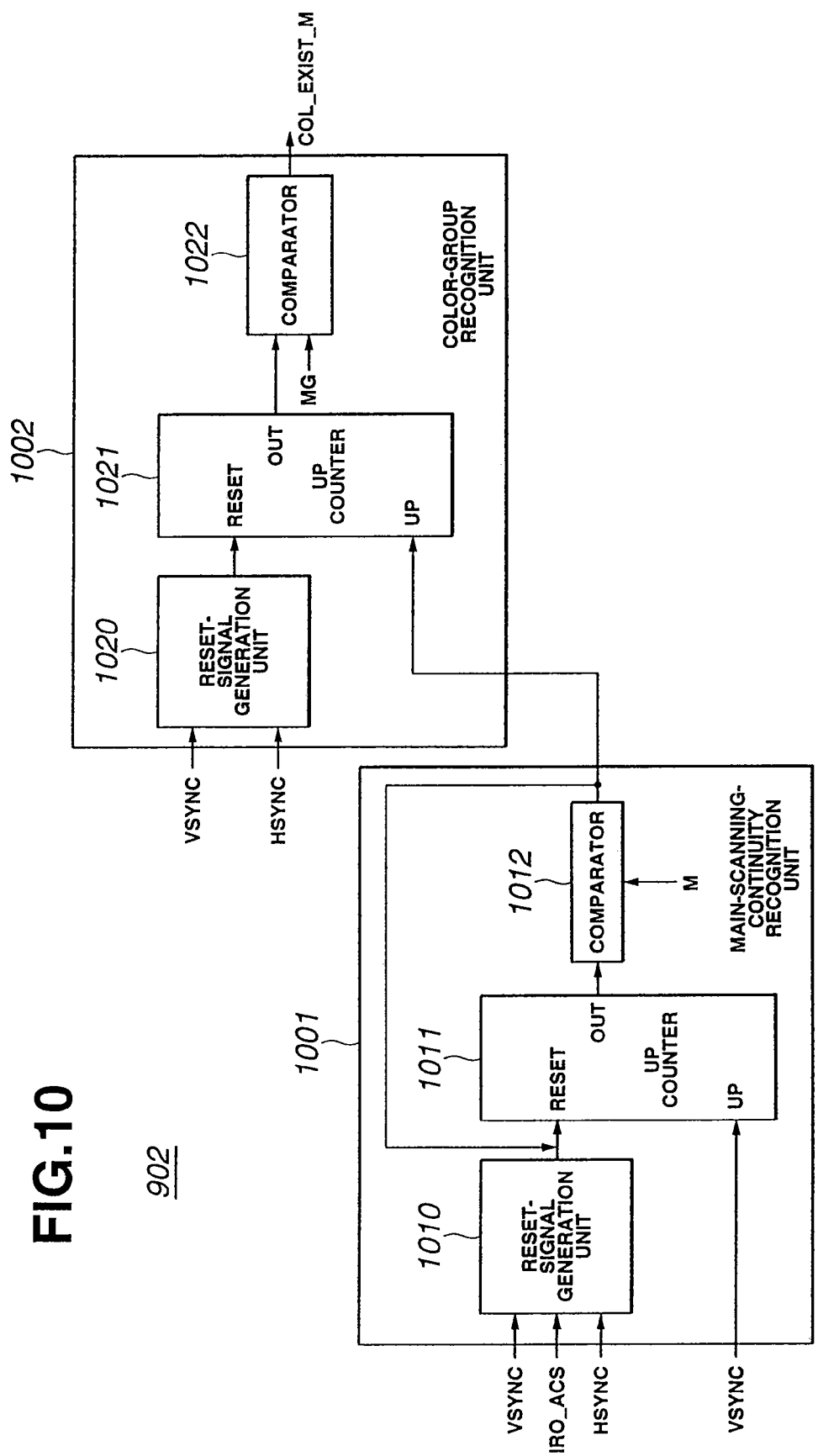
FIG. 10 is a block diagram illustrating an example of the configuration of a first main-scanning-color group recognition unit shown in FIG. 9.

The achromatic color/chromatic color determination signal KC subjected to region limitation is output as an IRO_ACS signal, and is determined by a first main-scanning-color-group recognition unit 902 whether or not a group of chromatic pixels consecutive in the main scanning direction by at least a predetermined number is present. FIG. 10 illustrates an example of the configuration of the first main-scanning-color-group recognition unit 902.

In FIG. 10, the first main-scanning-color-group recognition unit 902 includes a main-scanning-continuity recognition unit 1001 for determining whether or not pixels determined to be chromatic are consecutive in the main scanning direction by a predetermined number M 0, and a color-group recognition unit 1002 for recognizing the group of chromatic pixels consecutive by M recognized by the main-scanning-continuity recognition unit 1001 as a color group. The result of determination by the first main-scanning-color-group recognition unit 902 is transmitted to a main-scanning counting unit 903 provided at the immediately succeeding stage as a COL_EXIST_M (1-bit) signal.

Figure 11:
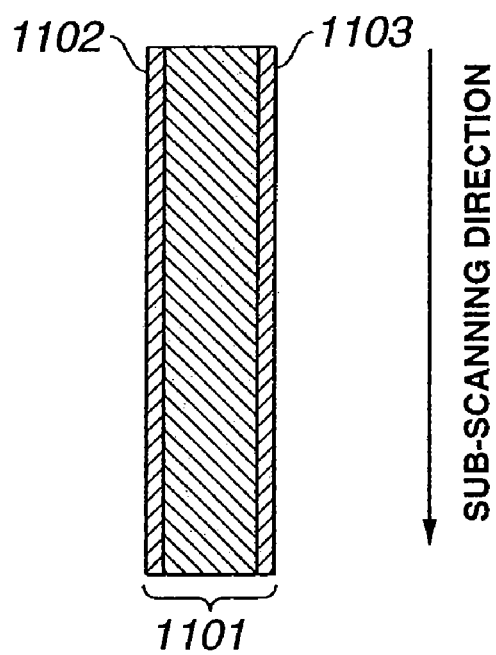
FIG. 11 is a diagram illustrating color deviation.

First, the main-scanning-continuity recognition unit 1001 will be described. Continuity of chromatic pixels in the main scanning direction is observed because of the following reason. That is, for example, as shown in FIG. 11, if color deviation in the main scanning direction occurs at edges (1102 and 1103 shown in FIG. 11) of a black vertical line 1101 by some reason (an MTF difference or an aberration of the lens, vibration of a mirror mount, or the like), a pseudo-color is generated at the edges 1102 and 1103 although these regions are originally achromatic, so that chromatic pixels appear in the sub-scanning direction by the length of the vertical line 1101.

If this erroneously determined portion is erroneously counted, determination of the type of the original (whether the original is a color original or a monochromatic original) is erroneously performed. Hence, by performing processing of recognizing continuity in the main scanning processing as described above, erroneous determination is prevented.

Next, the processing of the main-scanning-continuity recognition unit 1001 will be described.

First, when starting the processing, a counter 1011 for checking continuity is reset. In this embodiment, an up-counter is assumed for checking the degree of continuity of a chromatic color. Accordingly, in order to recognize the degree of continuity, the internal up-counter 1011 is reset at a timing of start of a copying sequence or start of a scanner operation, using a sub-scanning synchronizing signal (VSYNC) and a main-scanning synchronizing signal (HSYNC).

Since the internal up-counter 1011 counts consecutive chromatic-color determination signals, it is reset every time chromatic colors are not consecutive. Furthermore, in order to check the presence of chromatic colors in the main scanning direction, the internal up-counter 1011 is also reset upon completion of main scanning for one line. Hence, the internal up-counter 1011 is reset by the above-described three conditions. A reset-signal generation unit 1010 generates a reset signal for the counter 1011 from the VSYNC, HSYNC and IRO_ACS signals according to the above-described conditions, and supplies the reset terminal of the counter 1011 with the generated reset signal.

The value of the counter 1011 is incremented at every video clock signal (VCLK). When the counter value reaches a predetermined count value (M, M>0) without being reset, a comparator 1012 for comparing the count value with the predetermined value M generates a detection signal. The predetermined value M is stored in a ROM 122 (to be described later).

Figure 12:
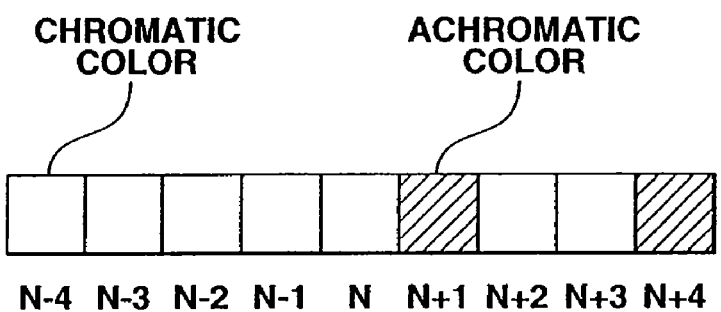
FIG. 12 is a diagram illustrating an example of output of an IRO_ACS signal, for explaining the operation of a main-scanning-continuity recognition unit shown in FIG. 10.

The operation of the main-scanning-continuity recognition unit 1001 will now be further described with reference to FIG. 12. For example, attention is paid to processing of determination signals for 9 pixels on one main-scanning line. A square shown in FIG. 12 illustrates the result of an achromatic color/chromatic color determination signal KC for one pixel (more strictly, an IRO_ACS signal subjected to region limitation). A white square represents a pixel determined to be chromatic, and a black square represents a pixel determined to be achromatic. In FIG. 12, a square (N−4) represents a result at the oldest time, and a square (N+4) represents a result at the most recent time.

The internal counter 1011 of the main-scanning-continuity recognition unit 1001 of the embodiment continuously counts four pixels from (N−4) to N. By detecting an IRO_ACS signal determining an achromatic color at a pixel (N+1), the reset-signal generation unit 1010 generates a reset signal to reset the internal counter 1011. The internal counter 1011 again starts counting from a pixel (N+2). When a pixel (N+3) has been counted, since a pixel (N+4) is a pixel determined to be achromatic, the internal counter 1011 is again reset.

During such a counting operation, when the count value reaches the predetermined value M, the comparator 1012 outputs a pulse signal for incrementing the count value of the internal counter 1021 within the color-group recognition unit 1002. This pulse signal is also used as a reset signal for the counter 1011 of the main-scanning-continuity recognition unit 1001, whereby presence/absence of chromatic pixels consecutive by M pixels is determined.

The internal counter 1011 used in this embodiment is configured by a finite number of bits. Hence, limitation is provided such that, when the count value OUT indicates a maximum value, counting is not performed further.

Next, the color-group recognition unit 1002 within the first main-scanning-color-group recognition unit 902 will be described. As the main-scanning-continuity recognition unit 1001, the color-group recognition unit 1002 includes an up-counter 1021, a comparator for comparing the count value of the counter 1021 with a predetermined threshold MG, and a reset-signal generation unit 1020.

When the main-scanning-continuity recognition unit 1001 detects chromatic pixels having the predetermined continuity value M, the value of the counter 1021 within the color-group recognition unit 1002 is incremented by a pulse signal output from the comparator 1012. After comparison of the count value of the counter 1021 with the predetermined value MG (the value set within a ROM 122 (to be described later)) by the comparator 1022, if the count value equals at least the predetermined value, a bit "1" is set in a COL_EXIST_M signal notifying that a group of chromatic pixels is present in the target main-scanning line. If the count value is less than the predetermined value, a bit "0" is set in the COL_EXIST_M signal assuming that a group of chromatic pixels is absent. Thus, a main-scanning counting unit provided at the immediately succeeding stage is notified of presence of a color in the target line.

As the reset-signal generation unit 1010 of the main-scanning-continuity recognition unit 1001, the reset-signal generation unit 1020 generates a reset signal for the counter 1021 at the end of one main-scanning line or at the timing of start of a copying sequence or start of a scanner operation, using the VSYNC and HSYSNC signals.

Next, the specific operation of the color-group recognition unit 1002 will be described with reference to FIG. 13.

Figure 13:
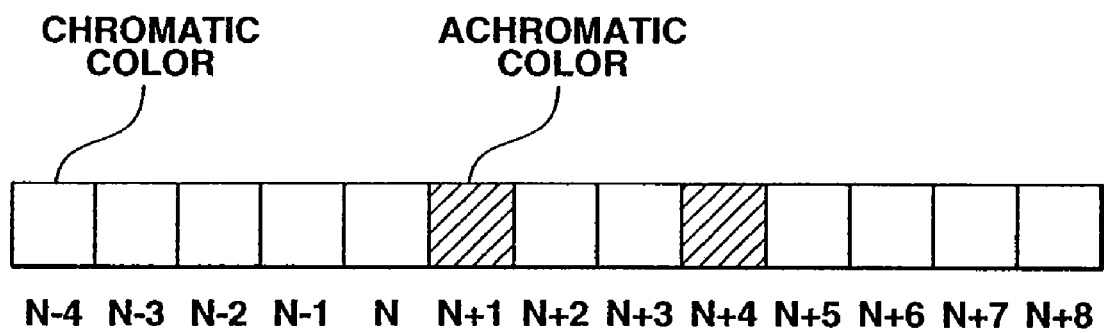
FIG. 13 is a diagram illustrating an example of output of the IRO_ACS signal, for explaining the operation of a color-group recognition unit shown in FIG. 10.

As the squares shown in FIG. 12, a white square and a black square shown in FIG. 13 represent a pixel determined to be chromatic and a pixel determined to be achromatic, respectively.

In order to facilitate understanding of the contents of the operation, a description will be provided together with the operation of the main-scanning-continuity recognition unit 1001. The operation will also be described assuming that the degree of continuity M detected by the main-scanning-continuity recognition unit 1001 is "2", and the parameter MG used for recognizing a color group by the color-group recognition unit 1002 is "3".

In the case shown in FIG. 13, since the count value of the internal counter 1011 for recognizing continuity in main scanning indicates 2 due to chromatic pixels (N−4) and (N−3), the comparator 1012 generates a pulse signal, and the value of the counter 1021 within the color-group recognition unit 1002 is incremented to 1. Since the pulse signal from the comparator 1012 is used as a reset signal for the counter 1011, the counter 1021 is reset after the value of the counter 1021 has been incremented.

Then, the count value of the counter 1011 again reaches "2" at a chromatic pixel (N−1), the value of the counter 1021 is incremented to 2. Since a pixel (N+1) is achromatic, the counter 1011 is reset. Then, at a pixel (N+3), the value of the counter 1021 is incremented to 3. At that time, since the count value equals the value MG, the comparator 1022 sets "1" in the COL_EXIST_M signal, to notify a main-scanning counting unit 903 provided at the immediately succeeding stage of presence of a color in the target line. Once the value of the COL_EXIST_M signal becomes "1", the value does not decrease in processing for the same mains-scanning line for which the value of the counter 1021 is the same. Hence, the value "1" is held for the main-scanning line.

In FIG. 13, the count values of the counters 1011 and 1021 are "2" and "5", respectively, when the processing has been completed to a pixel (N+8), and the counter 1011 is reset. Since the counter 1021 is configured by a finite number of bits as the counter 1011, limitation is provided such that the value is not incremented further when the count value reaches a maximum value.

Each of the counters 1021 and 1011 is reset at start of a copying sequence, start of a scanning operation, or every main-scanning line.

The contents of the operation of the first main-scanning-color-group recognition unit 902 have been described. As described above, the first main-scanning-color-group recognition unit 902 determines continuity of a predetermined number of chromatic pixels and presence of a group of consecutive pixels by a predetermined number on the target main-scanning line.

Next, the main-scanning counting unit 903 will be described.

Figure 14:
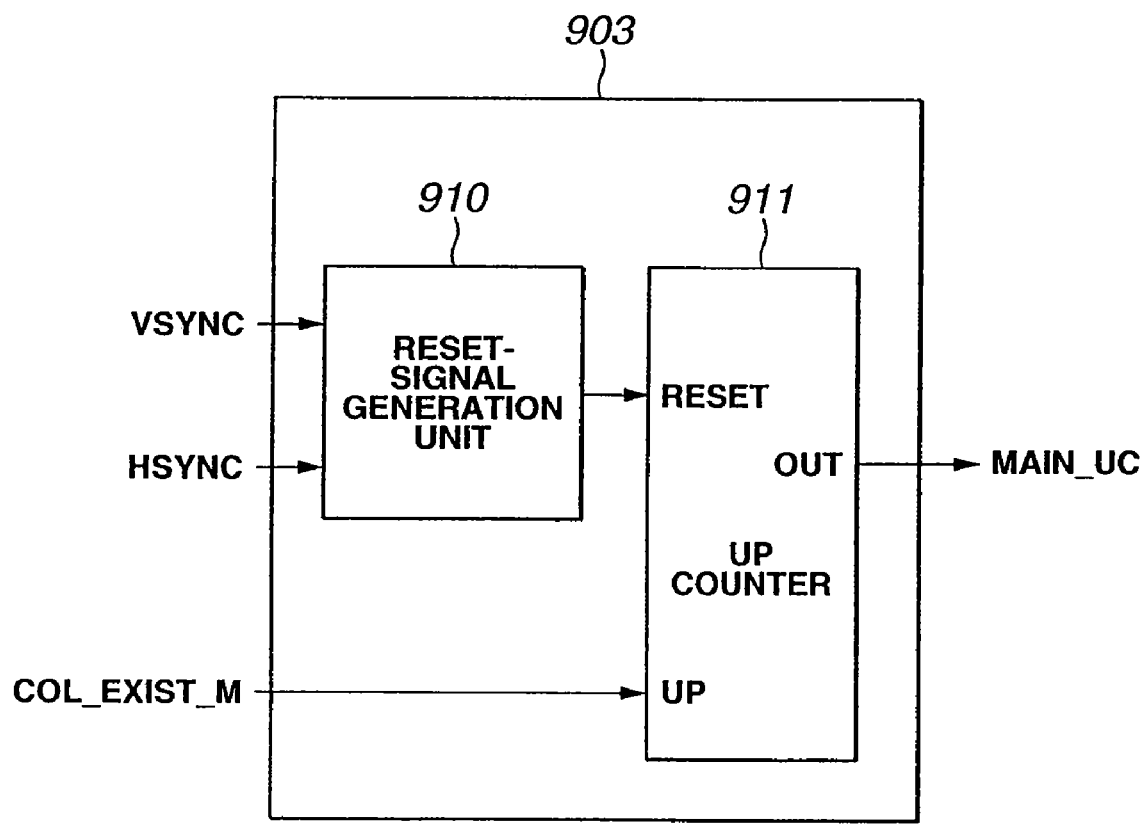
FIG. 14 is a block diagram illustrating an example of the configuration of a main-scanning counting unit shown in FIG. 9.

As shown in FIG. 14, as the main-scanning-continuity recognition unit 1001 or the color-group recognition unit 1002, the main-scanning counting unit 903 includes an up-counter 911 and a reset-signal generation unit 910.

The counter 911 is reset at start of a copying sequence or at a start of a scanning operation. Reset at every main-scanning line as the counters 1011 and 1021 of the first main-scanning-color-group recognition unit 902 is not performed. The reset-signal generation unit 910 generates a reset signal for resetting the counter 911 at predetermined timings, using VSYNC and HSYNC signals.

Counting by the counter 911 is performed when the processing of the first main-scanning-color-group recognition unit 902 has been completed and the value of the COL_EXIST_M signal has been ascertained.

That is, the counting is performed when a group of chromatic pixels having the set degree of continuity M has been detected MG times, and the presence of a color in the target line has been ascertained.

At that time, the counter 1021 within the first main-scanning-color-group recognition unit 902 is not reset until counting by the main-scanning counting unit 903 ends.

As the counters 1021 within the first main-scanning-color-group recognition unit 902, the counter 911 within the main-scanning counting unit 903 is limited so as not perform counting when the count value reaches a maximum value.

The determination processing in the main scanning direction has been described.

(Determination Processing in the Sub-Scanning Direction)

Figure 16:
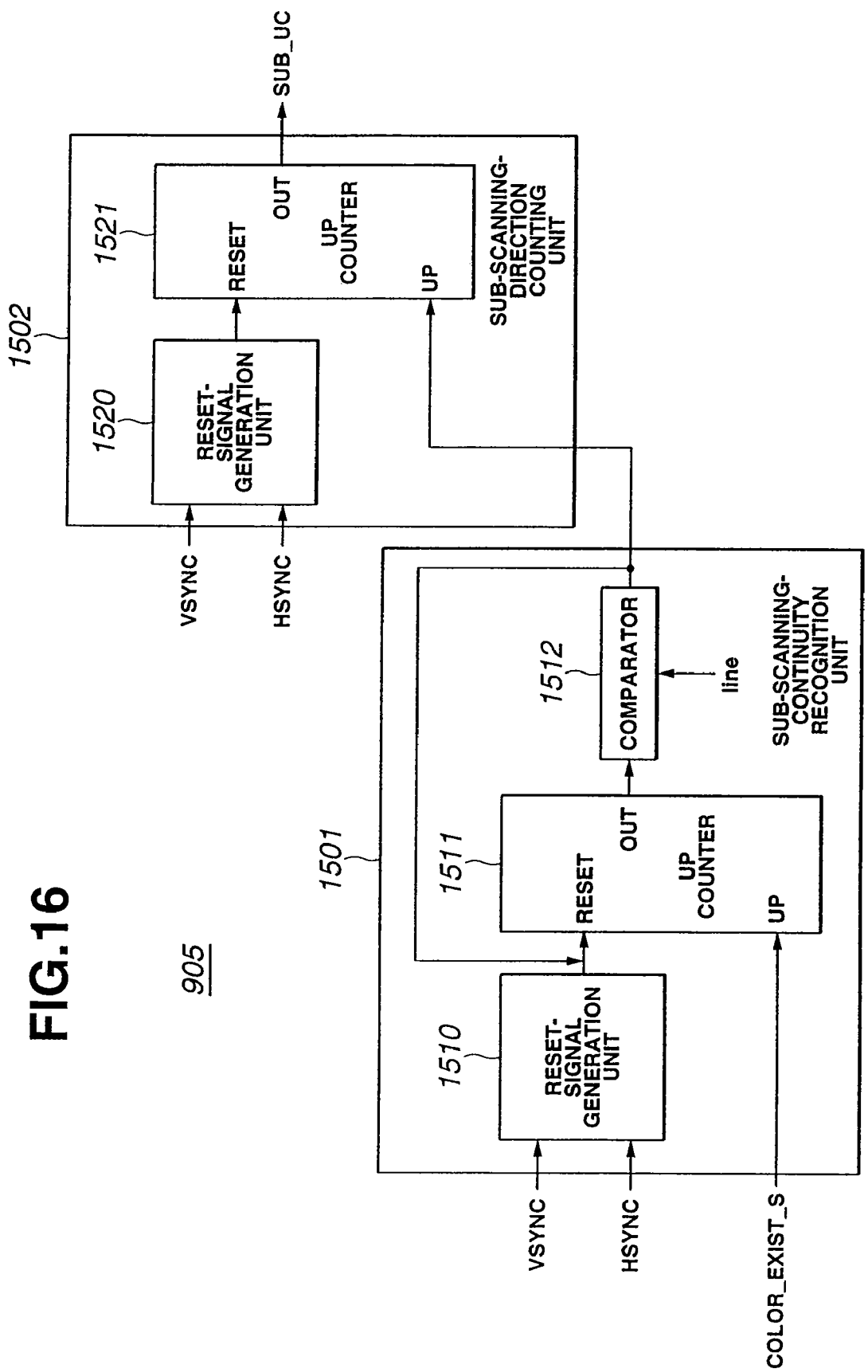
FIG. 16 is a block diagram illustrating an example of the configuration of a sub-scanning counting unit shown in FIG. 9.
Figure 17:
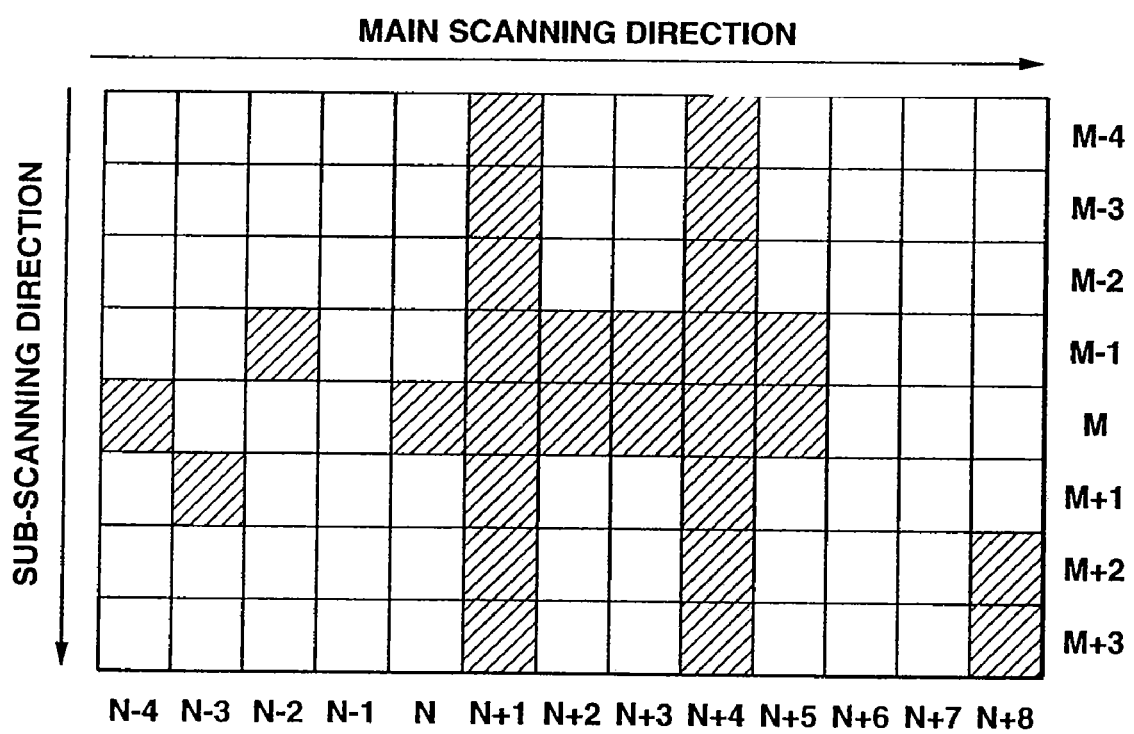
FIG. 17 is a diagram illustrating an example of output of the IRO_ACS signal, for explaining the operation of the sub-scanning counting unit shown in FIG. 16.

Next, determination processing in the sub-scanning direction will be described with reference to FIGS. 15-17.

As in the determination processing in the main scanning direction, the determination processing in the sub-scanning direction is performed by a second main-scanning-color-group recognition unit 904 (for sub-scanning) and a sub-scanning counting unit 905. The determination processing in the sub-scanning direction has the feature that when the presence of a group of color pixels in the target line is recognized, the presence of a color in the sub-scanning direction is recognized by checking the degree of continuity of the color group in the sub-scanning direction.

First, the second main-scanning-color-group recognition unit 904 will be described with reference to FIG. 15.

Figure 15:
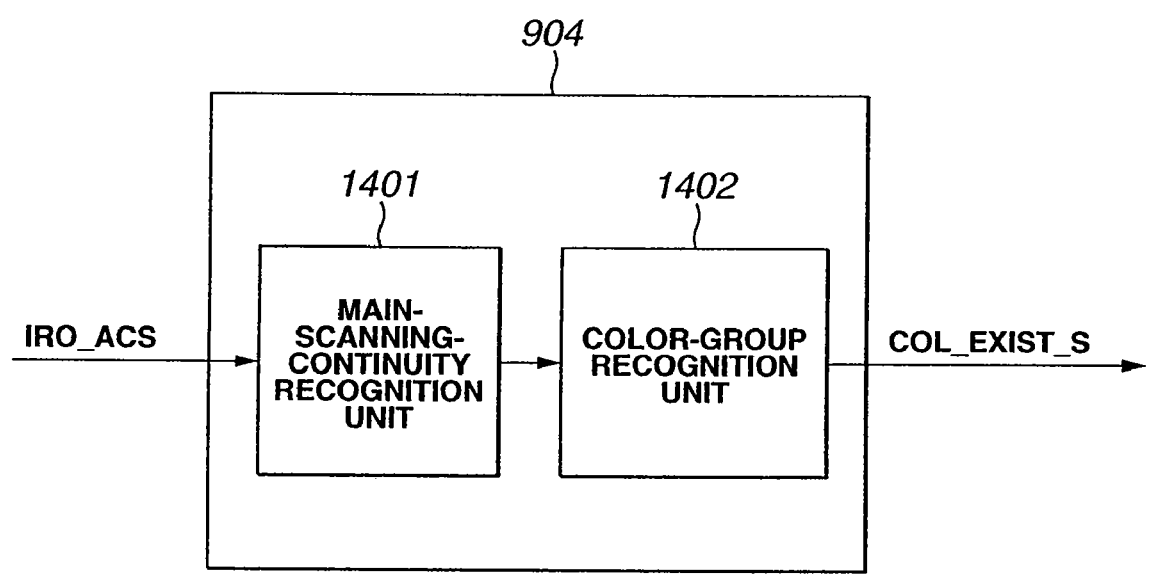
FIG. 15 is a block diagram illustrating an example of the configuration of a second main-scanning-color-group recognition unit shown in FIG. 9.

The second main-scanning-color-group recognition unit 904 has entirely the same configuration as the first main-scanning-color-group recognition unit 902 used in determination in the main scanning direction (units 1401 and 1402 shown in FIG. 15 have the same circuit configurations as the units 1001 and 1002 shown in FIG. 10, respectively, except that the degree of continuity M compared by the comparator 1012, the degree of continuity MG compared by the comparator 102, and the output signal COL_EXIST_M from the color-group recognition unit 1002 are changed to S, SG and COL_EXIST_S, respectively).

A configuration that is a feature of this embodiment in which the same processing is performed in determination processing in main scanning and sub-scanning is adopted, in order to provide different accuracy in determination by allowing to independently set parameters used in determination processing in main scanning and sub-scanning. Accordingly, in this embodiment, parameters S and SG for recognizing the degree of continuity for determination in sub-scanning can have values different from values of parameters M and MG for determination in main scanning.

Next, the processing of the sub-scanning counting unit 905 will be described with reference to FIGS. 16 and 17. FIG. 16 illustrates processing blocks within the sub-scanning counting unit 905.

First, a sub-scanning-continuity recognition unit 1501 within the sub-scanning counting unit 905 will be described.

As the main-scanning-continuity recognition unit 1001, the sub-scanning-continuity recognition unit 1501 includes an internal counter 1511, a comparator 1512 and a reset-signal generation unit 1510.

First, the value of a COL_EXIST_S signal transmitted from the second main-scanning-continuity recognition unit 904 provided at the preceding stage is counted after ascertaining the result of determination in one main-scanning line.

At that time, as in the case of recognizing the degree of continuity by the main-scanning-continuity recognition unit 1001, the comparator 1512 recognizes the degree of continuity in the sub-scanning direction (in comparison with a threshold "line").

If the value of the counter 1511 exceeds the threshold as a result of comparison, the value of the counter 1521 of the sub-scanning-direction counting unit 1502 provided at the succeeding stage is incremented.

The reset-signal generation unit 1510 of the sub-scanning-continuity recognition unit 1501 generates a reset signal for resetting the counter 1511 at start of a copy sequence and start of a scanning operation. The counter 1511 is also reset by a signal for incrementing the value of the counter 1521 of a sub-scanning-direction counting unit 1502 by the comparator 1512.

Similarly, a reset-signal generation unit 1520 of the sub-scanning-direction counting unit 1502 generates a reset signal for resetting the counter 1521 at start of a copying sequence and at start of a scanning operation.

Next, the processing of the sub-scanning counting unit 905 will be described with reference to FIG. 17. In FIG. 17, each of (N−4)–(N+8) represents the position of a pixel in the main scanning direction, each of (M−4)–(M+3) represents a line number in the sub-scanning direction, a white square represent a pixel determined to be chromatic, and a black square represents a pixel determined to be achromatic.

In order to facilitate understanding of the operation, thresholds for determining continuity are set such that S=3, SG=2, and line=3.

One main-scanning line starts at a pixel (N−4). When the one main-scanning line ends at a pixel (N+8), since three chromatic pixels are consecutive from a pixel (N−4) to a pixel (N−2), and from a pixel (N−1) to a pixel (N+1), the second main-scanning-color-group recognition unit 904 sets the COLOR_EXIST_S signal to 1. When the line has ended, the value of the internal counter 1511 of the sub-scanning-continuity recognition unit 1501 for a line (M−4) is incremented to 1.

Then, since lines (M−3) and (M−2) have the same pattern as the line (M−4), the count value of the counter 1511 is set to 3. At that time, the comparator 1512 detects that the degree of continuity reaches the threshold "line" (=3), and the value of the internal counter 1521 of the sub-scanning-direction counting unit 1502 is incremented. Then, the counter 1511 is reset by an output signal from the comparator 1512.

Then, since three consecutive chromatic pixels are also detected twice in a line (M−1), the COLOR_EXIST_S signal is set to 1. When the line has ended, the internal counter 1511 of the sub-scanning-continuity recognition unit 1501 is incremented to 1. The processing is continued in the same manner.

When the count value of the counter 1511 is set to 3 for a line (M+1), the value of the counter 1521 is again incremented to 2 by the comparator 1512.

Each of the counters 1511 and 1512 within the sub-scanning counting unit 905 is limited so as not to perform counting when the value of the counter reaches a maximum value.

The sub-scanning counting unit 905 and determination processing in the sub-scanning direction have been described.

When the result by each of determination units in the main scanning direction and the sub-scanning direction has been ascertained (indicating end of one scanning operation either in the forward direction or the backward direction), the result of each counting is checked by an identification unit 906.

The identification unit 906 determines whether the original is a monochromatic original or a color original according to predetermined determination conditions from a count value MAIN_UC of the main-scanning counting unit 903 and a count value SUB_UC of the sub-scanning counting unit 905.

The determination conditions can be arbitrarily determined. For example, if one of the count values in the main scanning direction and the sub-scanning direction becomes at least 1, it is assumed that a color is present in the original, and predetermined image processing is performed by setting the read original to processing dedicated to a color. Alternatively, it is possible to determine that the original is a color original if the count value of the main-scanning counting unit 903 equals at least 1, and the count value of the sub-scanning counting unit 905 equals at least 3. By thus combining the count value of the sub-direction counting unit, the possibility of erroneously detection of a pseudo-color generated at a contour of a black line can be reduced.

When the identification unit 906 determines that the original is a color original, image processing adapted to a color image, such as using color toners, is performed, and color image forming processing is performed in the printer unit 200. When the original has been determined to be a monochromatic original, image processing optimum for a monochromatic image, such as using only a black toner, is performed, and image forming processing is performed in the printer unit 200.

In this embodiment, respective units of the image processing unit 209 shown in FIG. 1A may be configured by hardware. However, for example, as shown in FIG. 1B, the image processing unit 209 may also be realized by a configuration in which a CPU (central processing unit) 121 executes a program stored in a ROM 122 by using a RAM (random access memory) 123 as a working area. In this case, data exchange between the image scanner unit 201 and the printer unit 200 is performed via an input/output unit 124. The RAM 123 is used not only as a working area for the CPU 121, but also as a temporary storage unit for image data read from the image scanner unit 201 and printing data to be transmitted to the printer unit 200. An external storage device, such as a hard-disk drive or the like, may also be used as a storage device capable of performing a reading/writing operation other than the RAM 123.

It is, of course, possible to configure only units having a large load of CPU processing from among the respective units shown in FIG. 1A with hardware, and realize other units by executing a program by the CPU.

As described above, according to the embodiment, even if color deviation occurs at an edge of a black fine line within a monochromatic original, it is possible to very precisely detect the type of the original by devising a method for counting color dots. More specifically, in a determination method in the main scanning direction and the sub-scanning direction, by checking continuity of color dots, it is possible to realize an algorithm having high latitude for color deviation compared with the conventional method performing simple calculation.

In addition, since accuracy in determination of the degree of continuity in the main scanning direction and the sub-scanning direction can be independently set, it is possible to set an appropriate threshold for each scanner type or for each scanner, and to have wider latitude.

The threshold for each determination described in the embodiment may dynamically changed appropriately. The timing to change the threshold is obtained, for example, by providing a unit for detecting the size of an image of an original, and using a signal from the detection unit.

By setting the threshold according to the characteristics (the amount of deviation of a reading position, and the like) of the image scanner unit, it is possible to perform very accurate determination without being influenced by differences among image scanner units, and to always perform appropriate determination even if the image scanner unit is exchangeable or can be selected from among a plurality of image scanner units.

The present invention may be applied to a system comprising a plurality of apparatuses (such as a host computer, an interface apparatus, a scanner, a printer and the like), or to a copier comprising a single unit as described above.

The objects of the present invention may, of course, also be achieved by supplying a system or an apparatus with a storage medium (or a recording medium) storing program codes of software for realizing the functions of the above-described embodiment, and reading and executing the program codes stored in the storage medium by means of a computer (or a CPU or an MPU (microprocessor unit)) of the system or the apparatus. In such a case, the program codes themselves read from the storage medium realize the functions of the above-described embodiment, so that the storage medium storing the program codes constitutes the present invention. The present invention may, of course, be applied not only to a case in which the functions of the above-described embodiment are realized by executing program codes read by a computer, but also to a case in which an OS (operating system) or the like operating in a computer executes a part or the entirety of actual processing, and the functions of the above-described embodiment are realized by the processing.

As described above, according to the embodiment, even if color deviation (deviation in a reading position, or the like) occurs, it is possible to very precisely identify whether an input image is a color image or a monochromatic image. Furthermore, by changing accuracy in determination in the main scanning direction and the sub-scanning direction in accordance with a difference peculiar to a scanner, it is possible to realize determination processing having a wide range of allowance for a scanner which can be used.

The individual components shown in outline or designated by blocks in the drawings are all well known in the image processing apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangement included within the spirit and scope of the appended claims. The scope of the following claims is to be accorded the broadest interpretation so as to encompass all such modifications and equivalent structures and functions.

What is claimed is:

1. An image processing apparatus comprising:
   first determination means for determining whether a chromatic pixel group exists on a main scanning line by determining whether chromatic pixels exist consecutively on the main scanning line;
   second determination means for determining whether the number of the chromatic pixel groups existing on the main scanning line is equal to or larger than a predetermined number;
   third determination means for determining, separately from the determination by the first determination means as to whether the chromatic pixels exist consecutively on the main scanning line, whether the chromatic pixels exist consecutively on the main scanning line, and further determining whether the main scanning lines on which the chromatic pixels exist consecutively, exist consecutively in a sub-scanning direction; and
   means for determining a target image to be a color image if either one of a determination result obtained by the second determination means and a determination result obtained by the third determination means is affirmative,
   wherein a parameter used for determining whether the chromatic pixels exist consecutively by the first determination means and a parameter used for determining whether the chromatic pixels exist consecutively by the third determination means are set separately.

2. An image processing apparatus according to claim 1, wherein a region of an image determined by the first determination means, the second determination means and the third determination means is an area at least without a front edge and an end edge of the image.

3. An image processing apparatus according to claim 1, further comprising means for determining whether or not an image to be processed is a color image by using the result of determinations made by the first determination means, the second determination means and the third determination means.

4. An image processing apparatus according to claim 3, wherein a color process is performed for an image to be processed when the image is determined to be a color image.

5. An image processing method, comprising:
   a first determination step, of determining whether a chromatic pixel group exists on a main scanning line by determining whether chromatic pixels exist consecutively on the main scanning line;
   a second determination step, of determining whether the number of the chromatic pixel groups existing on the main scanning line is equal to or larger than a predetermined number;
   a third determination step, of determining, separately from the determination in the first determination step as to whether the chromatic pixels exist consecutively on the main scanning line, whether the chromatic pixels exist consecutively on the main scanning line, and further determining whether the main scanning lines on which the chromatic pixels exist consecutively, exist consecutively in a sub-scanning direction; and
   a step of determining a target image to be a color image if either one of a determination result obtained in the second determination step and a determination result obtained in the third determination step is affirmative,
   wherein a parameter used for determining whether the chromatic pixels exist consecutively in the first determination step and a parameter used for determining whether the chromatic pixels exist consecutively in the third determination step are set separately.

6. A computer-readable storage medium storing an image processing program, the program comprising:
   a first determination code for determining whether a chromatic pixel group exists on a main scanning line by determining whether chromatic pixels exist consecutively on the main scanning line;
   a second determination code for determining whether the number of the chromatic pixel groups existing on the main scanning line is equal to or larger than a predetermined number;
   a third determination code for determining, separately from the determination by execution of the first determination code as to whether the chromatic pixels exist consecutively on the main scanning line, whether the chromatic pixels exist consecutively on the main scanning line, and further determining whether the main scanning lines on which the chromatic pixels exist consecutively, exist consecutively in a sub-scanning direction; and
   a code for determining a target image to be a color image if either one of a determination result obtained by execution of the second determination code and a determination result obtained by execution of the third determination code is affirmative,
   wherein a parameter used for determining whether the chromatic pixels exist consecutively in execution of the first determination code and a parameter used for determining whether the chromatic pixels exist consecutively in execution of the third determination code are set separately.

7. An image processing apparatus, comprising:
   first determination means for determining whether a chromatic pixel group exists on a main scanning line by determining whether chromatic pixels exist consecutively on the main scanning line;
   second determination means for determining whether the number of the chromatic pixel groups existing on the main scanning line is equal to or larger than a predetermined number;
   third determination means for determining, separately from the determination by the first determination means as to whether the chromatic pixels exist consecutively on the main scanning line, whether the chromatic pixels exist consecutively on the main scanning line, and further determining whether the main scanning lines on which the chromatic pixels exist consecutively, exist consecutively in a sub-scanning direction; and
   means for determining a target image to be a color image if either one of a determination result by the second determination means and a determination result of the third determination means is affirmative,
   wherein a determination part for the main scanning comprised of the first and second determination means and a determination part for the sub-scanning comprised of the third determination means have the same structure.

* * * * *